United States Patent
Li

(10) Patent No.: US 12,103,098 B1
(45) Date of Patent: Oct. 1, 2024

(54) STATIC VACUUM WELDING FURNACE

(71) Applicant: SHANDONG CAIJU ELECTRONIC TECHNOLOGY CO., LTD, Zibo (CN)

(72) Inventor: Xiangdong Li, Zibo (CN)

(73) Assignee: SHANDONG CAIJU ELECTRONIC TECHNOLOGY CO., LTD, Zibo (CN)

( * ) Notice: Subject to any disclaimer, the term of this patent is extended or adjusted under 35 U.S.C. 154(b) by 0 days.

(21) Appl. No.: 18/702,801

(22) PCT Filed: Feb. 7, 2023

(86) PCT No.: PCT/CN2023/074776
§ 371 (c)(1),
(2) Date: Apr. 19, 2024

(87) PCT Pub. No.: WO2024/119603
PCT Pub. Date: Jun. 13, 2024

(30) Foreign Application Priority Data

Dec. 6, 2022 (CN) .......................... 202211556779.6

(51) Int. Cl.
  *B23K 1/00*   (2006.01)
  *B23K 1/008*  (2006.01)
  *B23K 3/00*   (2006.01)

(52) U.S. Cl.
  CPC .................................. *B23K 1/008* (2013.01)

(58) Field of Classification Search
  None
  See application file for complete search history.

(56) References Cited

FOREIGN PATENT DOCUMENTS

| CN | 107838516 A | 3/2018 |
|---|---|---|
| CN | 107855622 A | 3/2018 |
| CN | 107855623 A | 3/2018 |
| CN | 107931768 A | 4/2018 |
| CN | 108155129 A | 6/2018 |
| CN | 207873342 U | 9/2018 |
| CN | 208648103 U | 3/2019 |
| CN | 109773297 A | 5/2019 |
| CN | 208853579 U | 5/2019 |
| CN | 209407620 U | 9/2019 |
| CN | 211939417 U | 11/2020 |
| CN | 113655231 A | 11/2021 |

(Continued)

*Primary Examiner* — Devang R Patel
(74) *Attorney, Agent, or Firm* — Bayramoglu Law Offices LLC

(57) ABSTRACT

A static vacuum welding furnace is provided. The device is characterized in that a plurality of welding chambers are arranged side by side at intervals; cover closing devices are connected to the welding chambers and drive the welding chambers to be opened or closed; a feeding and discharging device is arranged on one sides of the welding chambers; a transfer device is arranged between the feeding and discharging device and all the welding chambers; all the welding chambers are connected with heating devices and cooling devices; a material sheet pushing-in device and a material sheet pushing-out device are each arranged on two sides of a material sheet positioning device; and a space for containing a material box is formed between the material sheet pushing-out device and the material sheet positioning device. The static vacuum welding furnace can simultaneously weld a plurality of material sheets.

5 Claims, 17 Drawing Sheets

(56) References Cited

FOREIGN PATENT DOCUMENTS

| | | |
|---|---|---|
| CN | 114653622 A | 6/2022 |
| CN | 115625393 A | 1/2023 |
| DE | 102020129759 A1 | 5/2022 |
| JP | 2009221552 A | 10/2009 |
| JP | 5601436 B1 | 10/2014 |
| WO | 2015011785 A1 | 1/2015 |

B

C

E

STATIC VACUUM WELDING FURNACE

CROSS REFERENCE TO THE RELATED APPLICATIONS

This application is the national phase entry of International Application No. PCT/CN2023/074776, filed on Feb. 7, 2023, which is based upon and claims priority to Chinese Patent Application No. 202211556779.6, filed on Dec. 6, 2022, the entire contents of which are incorporated herein by reference.

TECHNICAL FIELD

A static vacuum welding furnace belongs to the technical field of vacuum welding furnaces.

BACKGROUND

A vacuum welding furnace (a vacuum soldering furnace) performs high-quality welding on products in a vacuum environment. During heating or cooling, a reducing system ($N_2$, formic acid, $N_2H_2$, $H_2$) is introduced to protect a product and a soldering flux from being oxidized. Meanwhile, the product reacts with an oxide on a surface of the soldering flux, so that the quality of a welding surface is improved, and the voidage of welding is reduced.

There are usually two types of existing vacuum welding furnaces. One type is a passing-continuous vacuum welding furnace. That is, a workpiece to be welded moves among a heating station, a welding station, and a cooling station in sequence to complete welding of the workpiece. However, this type of vacuum welding furnace has the following problems during use: 1) The equipment has a large length, occupies a large space, and difficultly meets the space needs of a customer. 2) During transportation of the workpiece, two parts to be welded on the workpiece easily move relatively, positions of the two parts to be welded of the workpiece are aligned inaccurately, leading to a poor qualification rate of the welded workpiece. The other type is a fixed vacuum welding furnace. That is, a workpiece is placed in the welding furnace and heated to a specified temperature in the welding furnace. Then, the welding furnace is vacuumed to achieve the welding of the workpiece. This type of vacuum welding furnace has the following problems during use: A temperature of the workpiece during welding is high, and after the welding is completed, the workpiece needs to be cooled to a specified temperature before the welding furnace is turned on, so as to avoid the workpiece being in contact with air and being oxidized. However, due to the high temperature of the welding furnace, the workpiece has a low cooling speed, which leads to a very low welding speed.

Therefore, it is hard for the existing vacuum welding furnaces to take into account the qualification rates of the welded workpieces while meeting the welding speed, and the automation level of the existing fixed welding furnaces is low.

SUMMARY

Technical problems to be solved in the present invention are as follows: To overcome the shortcomings in the prior art, a static vacuum welding furnace which can automatically feed and discharge material sheets, has a high qualification rate of a welded workpiece, and has a high welding speed is provided.

Technical solutions used by the present invention to solve the technical problems are as follows: A static vacuum welding furnace includes a feeding and discharging device, a transfer device, a plurality of welding chambers, and cover closing devices, wherein the welding chambers are arranged side by side at intervals; the cover closing devices are connected to the welding chambers and drive the welding chambers to be opened or closed; the feeding and discharging device is arranged on one sides of the welding chambers; the transfer device is arranged between the feeding and discharging device and all the welding chambers; all the welding chambers are connected with heating devices and cooling devices;

the feeding and discharging device includes a material sheet pushing-in device, a material sheet pushing-out device, and a material sheet positioning device; the material sheet pushing-in device and the material sheet pushing-out device are each arranged on two sides of the material sheet positioning device; and a space for containing a material box is arranged between the material sheet pushing-out device and the material sheet positioning device.

Preferably, the material sheet pushing-out device includes a material sheet pushing-out plate, a pushing-out buffer device, and a material sheet pushing-out power device; the material sheet pushing-out plate is connected to the material sheet pushing-out power device, and the material sheet pushing-out plate moves in a direction close to or away from material sheet positioning device; and the pushing-out buffer device is arranged between the material sheet pushing-out plate and the material sheet pushing-out power device. The material sheet pushing-out power device pushes the material sheet pushing-out plate to move, and material sheets inside the material box are pushed out through the material sheet pushing-out plate. The pushing-out buffer device can play a buffer effect, which can ensure that the material sheets are pushed in place and avoid damage to the material sheets.

Preferably, the pushing-out buffer device includes a material sheet pushing-out spring; the material sheet pushing-out plate slides relative to the material sheet pushing-out power device, with a sliding direction parallel to a movement direction of the material sheet pushing-out plate; and the material sheet pushing-out spring is arranged between the material sheet pushing-out power device and the material sheet pushing-out plate. The material sheet pushing-out power device pushes the material sheet pushing-out plate to move through the material sheet pushing-out spring, which can not only push the material sheet pushing-out plate, but also allow relative movement between the material sheet pushing-out power device and the material sheet pushing-out plate to achieve buffering.

Preferably, the material sheet positioning device includes a material sheet positioning groove, and an opening of the material sheet positioning groove faces upwards. Positioning of the material sheets is achieved through the material sheet positioning groove, which not only facilitates the transfer device to accurately suck the material sheets, but also can ensure alignment between the material sheet and the material box when a welded material sheet is pushed into the material box.

Preferably, the feeding and discharging device further includes a material box feeding device, a material box jacking device, a material box bracket, and a material box pushing-out device; the material box jacking device is arranged in a space; the material box pushing-out device and the material box bracket are each arranged on two sides of the material box jacking device; the material box pushing-out device and the material box bracket directly face to each other; the material box feeding device is arranged on one side of the material box jacking device; and the material box feeding device and the material box bracket are spaced apart from each other in a longitudinal direction. The material box feeding device can feed the material box filled with the material sheets into the material box jacking device. The material box jacking device drives the material box to move directly opposite to the material sheet pushing-out device, so as to facilitate the pushing out of the material sheet to be welded and the pushing in of the welded material sheet. The material box pushing-out device can push the material box onto the material box bracket, thereby achieving automatic feeding and automatic receiving of the material sheet.

Preferably, the material box jacking device includes a material box jacking power device, a jacking frame, and a pressing device; the material box jacking power device is connected to the jacking frame and drives the jacking frame to rise and fall; a bottom of the jacking frame is provided with a material box supporting part; the pressing device is mounted at a top of the jacking frame; and the pressing device directly faces to the material box supporting part. The pressing device can press the material box onto the material box supporting part, which ensures that the material box is more stable during movement.

Preferably, the feeding and discharging device further includes an adjustment device; the adjustment device is mounted on the material box jacking power device; the adjustment device is connected to the jacking frame; and an adjustment direction of the adjustment device is the same as a pushing-out direction of the material box pushing-out device. The adjustment device can adjust the position of the jacking frame to ensure that the material box on the jacking frame directly faces to the material sheet positioning device.

Preferably, the material box pushing-out device includes a plurality of material box push rods and a material box pushing-out power device; the plurality of material box push rods are arranged side by side; the material box pushing-out power device is simultaneously connected to all the material box push rods; and all the material box push rods move synchronously in a direction close to or away from the material box bracket. The material box pushing-out power device pushes the material box to move through the material box push rods, and the material box is pushed onto the material box bracket, which achieves continuous feeding of the material sheets.

Preferably, the static vacuum welding furnace includes a plurality of groups of welding chambers arranged side by side and spaced apart from each other; each group of welding chambers includes two welding chambers spaced apart from each other in a longitudinal direction; and each group of welding chambers is connected to the cover closing device. The welding chambers and the cover closing devices achieve modularized mounting, and the quantity of the welding chambers can be increased or decreased according to needs of customers, so as to meet the requirement for a welding speed.

Preferably, each cover closing device includes a first cover closing device and a second cover closing device; the first cover closing device and the second cover closing device are connected to two welding chambers of the same group; and the second cover closing device is mounted on the first cover closing device. The first cover closing device and the second cover closing device can drive the two welding chambers in the same group to achieve cover closing, so that the control is more flexible.

Beneficial Effects

Compared with the prior art, beneficial effects of the present invention are as follows:

The transfer device of the static vacuum welding furnace can feed the material sheets to be welded on the material sheet positioning device into the various welding chambers one by one, and also transfer the welded material sheets from the welding chambers to the material sheet positioning device. The various welding chambers work independently, so that a plurality of material sheets can be welded at the same time. Furthermore, the cooling device can cool the welding chambers to ensure that the welded material sheets are cooled quickly to a specified temperature, which improves the welding speed of the material sheets. The material sheets are heated, welded, and cooled in the same welding chamber. In the entire process, the material sheets are static, which ensures a good communication effect between the welded material sheets and a chip. The material sheet pushing-in device can push the material sheets in the material box one by one onto the material sheet positioning device. The material sheet pushing-in device can push the welded material sheets into the material box, which achieves automatic pushing out and automatic boxing of the material sheets. The static vacuum welding furnace has high automation degree, high working speed, and high qualification rate of the welded material sheets.

Figure 1:
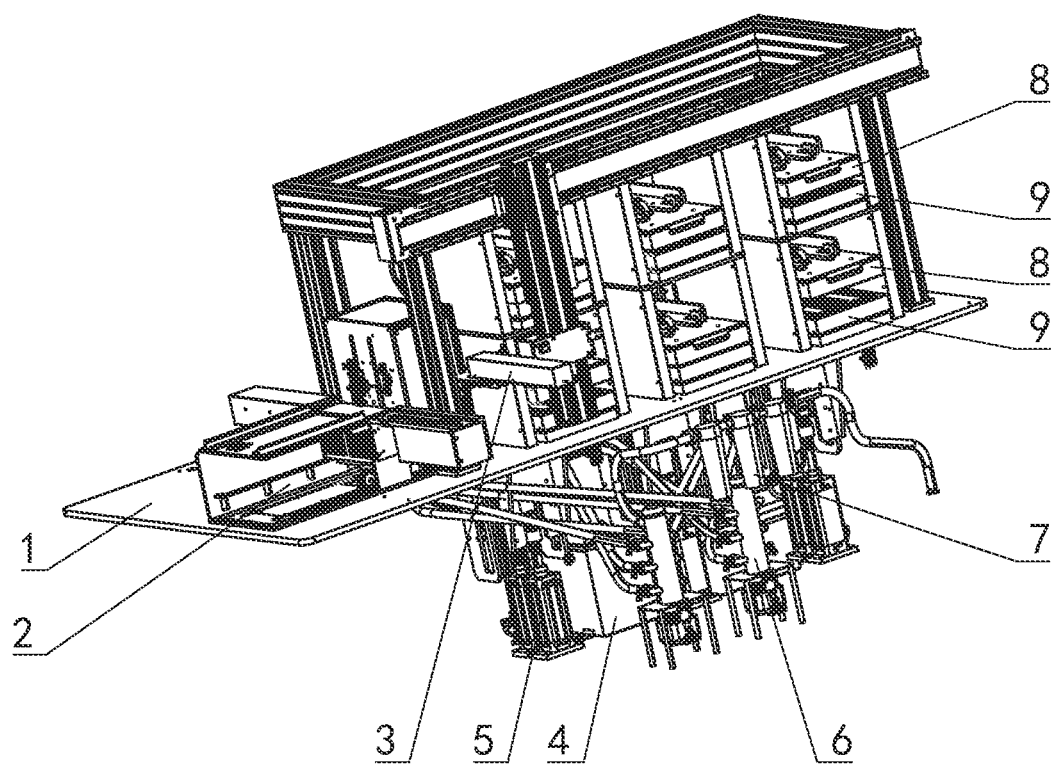
FIG. 1 is a three-dimensional schematic diagram of a static vacuum welding furnace.

In the drawings: 1: stand; 2: feeding and discharging device; 3: transfer device; 4: circulating water tank; 5: cover closing device; 6: condensing assembly; 7: filtering assembly; 8: welding chamber top cover; 801: air suction port; 9: welding chamber base; 10: condenser; 11: lower supporting plate; 12: conveying synchronous belt; 13: material sheet pushing-out plate; 14: pressure plate; 15: material sheet pushing-in plate; 16: material sheet pushing-in frame; 17: material sheet positioning groove; 18: material box push rod; 19: jacking frame; 20: material sheet pushing-in synchronous belt; 21: material sheet pushing-in spring; 22: material sheet pushing-in guide rail; 23: upper supporting plate; 24: conveying motor; 25: material box pushing cylinder; 26: material box jacking motor; 27: material box jacking screw rod; 28: adjustment cylinder; 29: adjustment frame; 30: jacking seat; 31: material box pressing cylinder; 32: material box pushing frame; 33: material sheet pushing-out synchronous belt; 34: material sheet pushing-out frame; 35: material sheet pushing-out spring; 36: translation guide rail; 37: translation frame; 38: vertical column; 39: jacking frame; 40: expansion and retraction frame; 41: suction nozzle; 42: expandable synchronous belt; 43: expansion and retraction driving motor; 44: thermal protection shield; 45: support plate; 4501: outer plate; 4502: inner plate; 4503: air inlet slot; 46: base main body; 47 heating pipe; 48: air inlet pipe; 49: first cover closing cylinder; 50: first cover closing frame; 51: second cover closing guide rail; 52: second cover closing frame; 53: mounting seat; 54: first cover closing guide rail; 55: lower cooling channel; 56: second cover closing cylinder; 57: separation pipe; and 58: collection bottle.

DETAILED DESCRIPTION OF THE EMBODIMENTS

The following will make a further explanation of the present invention in conjunction with specific embodiments. However, those skilled in the art should understand that the detailed description provided here in conjunction with the accompanying drawings is for better explanation. The structure of the present invention inevitably goes beyond these limited embodiments. For some equivalent replacement solutions or common means, detailed descriptions will not be made herein, but this still falls within the protection scope of the present application.

Figure 17:
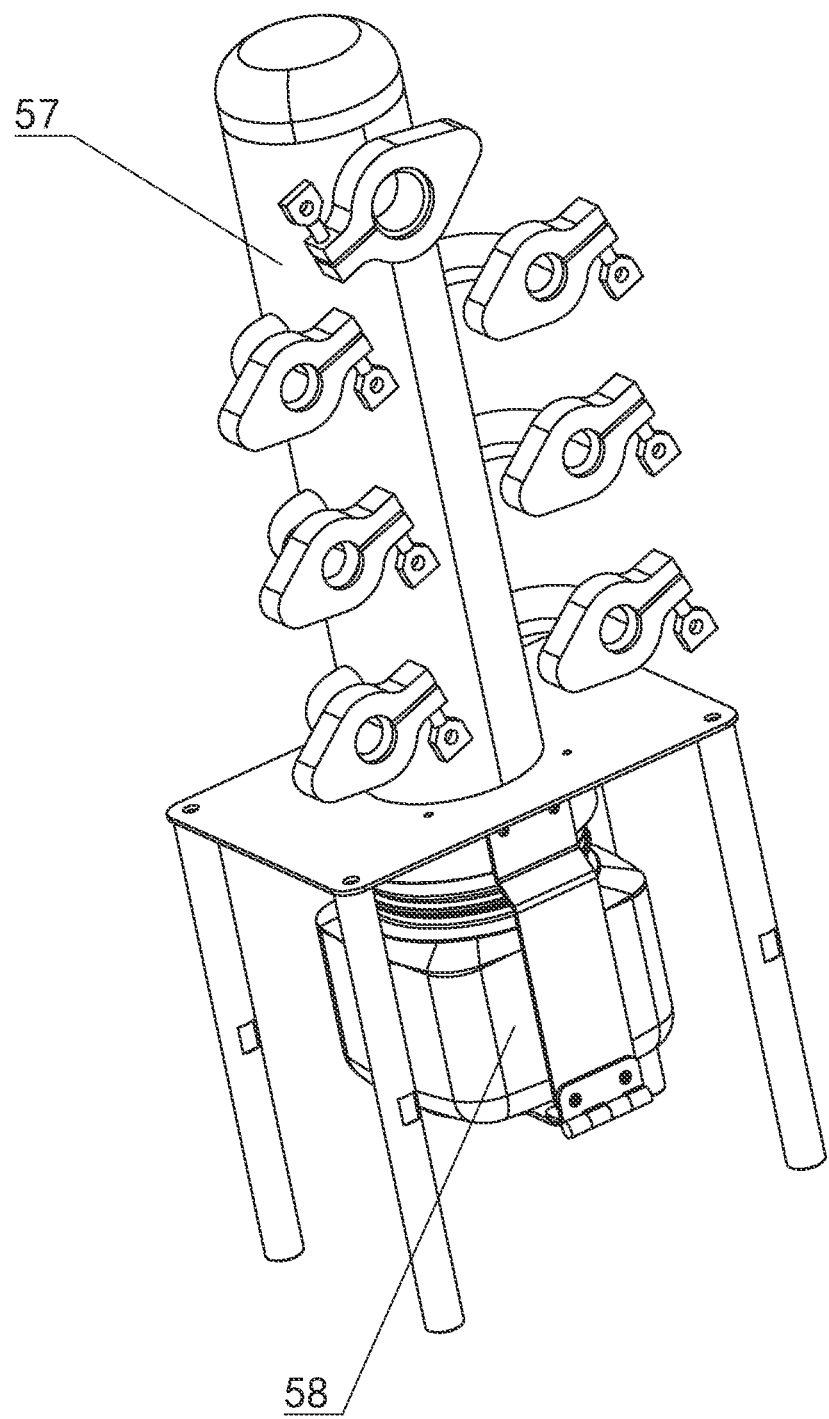
FIG. 17 is a three-dimensional schematic diagram of a condensing assembly.

FIG. 1 and FIG. 17 are the optimal embodiments of the present invention. The present invention will be further explained below in conjunction with the accompanying drawings 1 to 17.

A static vacuum welding furnace includes: a feeding and discharging device 2, a transfer device 3, a plurality of welding chambers, and cover closing devices 5, wherein the welding chambers are arranged side by side at intervals; the cover closing devices are connected to the welding chambers and drive the welding chambers to be opened or closed; the feeding and discharging device 2 is arranged on one sides of the welding chambers; the transfer device 3 is arranged between the feeding and discharging device 2 and all the welding chambers; all the welding chambers are connected with heating devices and cooling devices; the feeding and discharging device 2 includes a material sheet pushing-in device, a material sheet pushing-out device, and a material sheet positioning device; the material sheet pushing-in device and the material sheet pushing-out device are each arranged on two sides of the material sheet positioning device; and a space for containing a material box is arranged between the material sheet pushing-out device and the material sheet positioning device. The transfer device of the static vacuum welding furnace can feed the material sheets to be welded on the material sheet positioning device into the various welding chambers one by one, and also transfer the welded material sheets from the welding chambers to the material sheet positioning device. The various welding chambers work independently, so that a plurality of material sheets can be welded at the same time. Furthermore, the cooling device can cool the welding chambers to ensure that the welded material sheets are cooled quickly to a specified temperature, which improves the welding speed of the material sheets. The material sheet pushing-in device can push the material sheets in the material box one by one onto the material sheet positioning device. The material sheet pushing-in device can push the welded material sheets into the material box, which achieves automatic pushing out and automatic boxing of the material sheets. The static vacuum welding furnace has high automation degree, high working speed, and high qualification rate of the welded material sheets.

Figure 2:
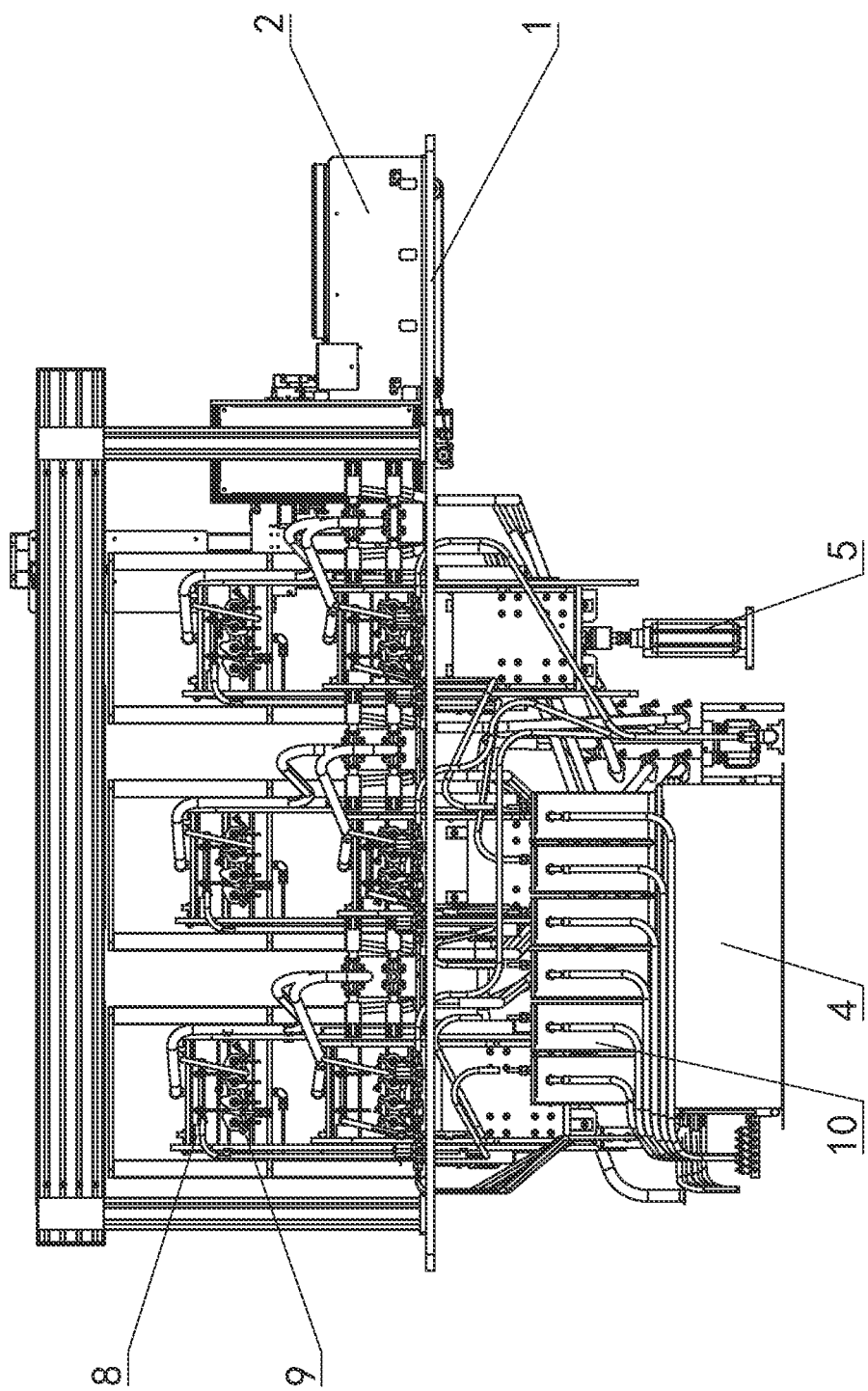
FIG. 2 is a schematic diagram of a rear view of a static vacuum welding furnace.

Specifically, as shown in FIG. 1 to FIG. 2, the static vacuum welding furnace further includes a stand 1; the welding chambers are mounted on the stand 1; a plurality of groups of welding chambers are arranged side by side and spaced apart from each other; and each group of welding chambers includes two welding chambers spaced apart from each other. In this embodiment, there are three groups of welding chambers arranged side by side and spaced apart from each other. Each group of welding chambers is connected with the cover closing device 5.

Each welding chamber includes a welding chamber base 9 and a welding chamber top cover 8. The welding chamber top cover 8 is fastened to an upper side of the welding chamber base 9 and closes a top of the welding chamber base 9, and a welding cavity is formed between the welding chamber base 9 and the welding chamber top cover 8. The cover closing devices 5 are connected to the welding chamber top cover 8 and push the welding chamber top cover 8 to rise and fall, so as to drive the welding chamber top cover 8 to be opened and closed. The heating device includes a lower heating device arranged in the welding chamber base 9 and an upper heating device arranged in the welding chamber top cover 8.

The feeding and discharging device 2 is arranged on one sides of the welding chambers; the feeding and discharging device 2 is mounted on the stand 1, and the transfer device 3 is also mounted on the stand 1. The transfer device 3 is arranged between the feeding and discharging device 2 and the welding chambers. The transfer device 3 transfers material sheets to be welded on the feeding and discharging device 2 into the various welding chambers one by one, and transports the welded material sheets from the various welding chambers back to the feeding and discharging device 2 one by one.

The cooling device includes condensers 10, a cooling pump, a circulating water tank 4, and lower cooling channels 55 and upper cooling channels which are arranged on the welding chambers. Each upper cooling channel and each lower cooling channel 55 are arranged in each welding chamber. A delivery outlet of the lower cooling channel 55 of each welding chamber is communicated to a delivery inlet of the upper cooling channel. In this embodiment, the condensers 10 are in one-to-one correspondence to the welding chambers, and there is only one cooling pump and one circulating water tank 4. The condensers 10, the circulating water tank 4, and the cooling pump are all mounted on the stand 1. The condensers 10 are arranged side by side on an upper side of the circulating water tank 4. Delivery outlets of the upper cooling channels of the various welding chamber are communicated to tube side inlets of the corresponding condensers 10, and tube side outlets of the various condensers 10 are communicated to a top of the circulating water tank 4. A delivery inlet of the cooling pump is communicated to a lower part or a bottom of the circulating water tank 4, and a delivery outlet of the cooling pump is also communicated to the delivery inlets of the lower cooling channels 55 of the various welding chamber. Shell sides of the various condensers 10 are connected to circulating cooling water.

During cooling of the welding chambers, due to high temperatures of the welding chambers, the circulating water will be vaporized. The vaporized circulating water vapor enters the condensers 10 for condensation and then enters the circulating water tank 4, thus achieving recycling of water.

The cooling device further includes a balance pipe and a water outlet pipe. The delivery outlets of the upper cooling channels of the various welding chamber are simultaneously connected to a delivery inlet of the water outlet pipe and a delivery inlet of the balance pipe. A delivery outlet of the balance pipe is communicated to the circulating water tank 4, and a delivery outlet of the water outlet pipe is communicated to tube side inlets of the condensers 10. Stop valves are arranged between the delivery inlet of the balance pipe and the delivery outlets of the upper cooling channels, as well as between the delivery inlet of the water outlet pipe and the delivery outlets of the upper cooling channels. Stop valves are also arranged between a delivery outlet of the cooling pump and the delivery inlets of the various lower cooling channels 55.

During cooling of the welding chambers, the stop valves between the delivery inlet of the balance pipe and the delivery outlet of the upper cooling channels are closed; the stop valves between the delivery inlet of the cooling pump and the delivery inlets of the lower cooling channels 55 are opened; the stop valves between the delivery inlet of the water outlet pipe and the delivery outlets of the upper cooling channels are opened. Meanwhile, after the cooling pump causes the circulating water in the circulating water tank 4 to pass through the lower cooling channels 55, the upper cooling channels, and the water outlet pipe in sequence, the circulating water enters the tube sides of the condensers 10; and the circulating water enters the circulating water tank 4 after being condensed.

During heating of the welding chambers, due to retention of some circulating water in the upper cooling channels and the lower cooling channels 55, the stop valves between the cooling pump and the delivery inlets of the lower cooling channels 55 are closed, and the stop valves between the delivery inlet of the water outlet pipe and the delivery outlets of the upper cooling channels are closed; and at the same time, the stop valves between the delivery inlet of the balance pipe and the delivery outlets of the upper cooling channels are opened. In the heating process, the circulating water in the upper cooling channels and the lower cooling channels 55 is liquefied and enters the circulating water tank 4 through the balance pipe. Due to a limited amount of water in this part, steam directly entering the circulating water tank 4 is in contact with the water in the circulating water tank 4 and condensed.

The cooling device may also be not provided with the circulating water tank 4, the condensers 10, and the cooling pump, and circulating water is directly introduced into the upper cooling channels and the lower cooling channels 55. The cooling device can also directly use a semiconductor refrigerator.

A vacuumizing device includes a condensing assembly 6, a filtering assembly 7, and a vacuum pump. A delivery inlet of the vacuum pump is communicated to a delivery outlet of the condensing assembly 6, and a delivery inlet of the condensing assembly 6 is simultaneously communicated to the welding cavities of the various welding chambers. The filtering assembly 7 is arranged between a delivery outlet of the condensing assembly 6 and a delivery inlet of the vacuum pump. There are a plurality of filtering assemblies 7 connected in series. In this embodiment, there are three filtering assemblies 7 connected in series. The filtering assembly 7 can directly use the existing filter, and the structure of the filtering assembly 7 will not be elaborated here.

Figure 3:
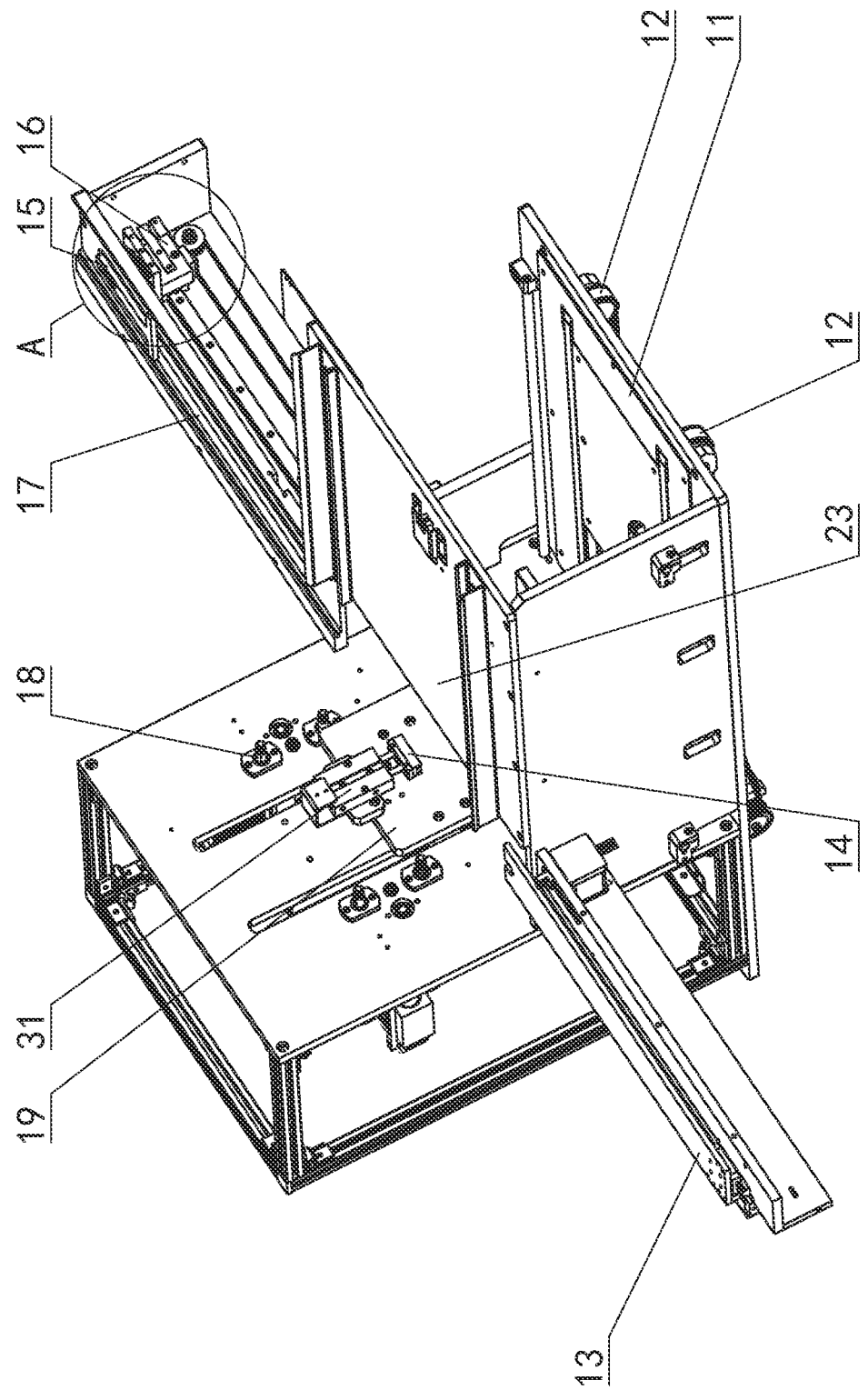
FIG. 3 is a three-dimensional schematic diagram of a feeding and discharging device.
Figure 4:
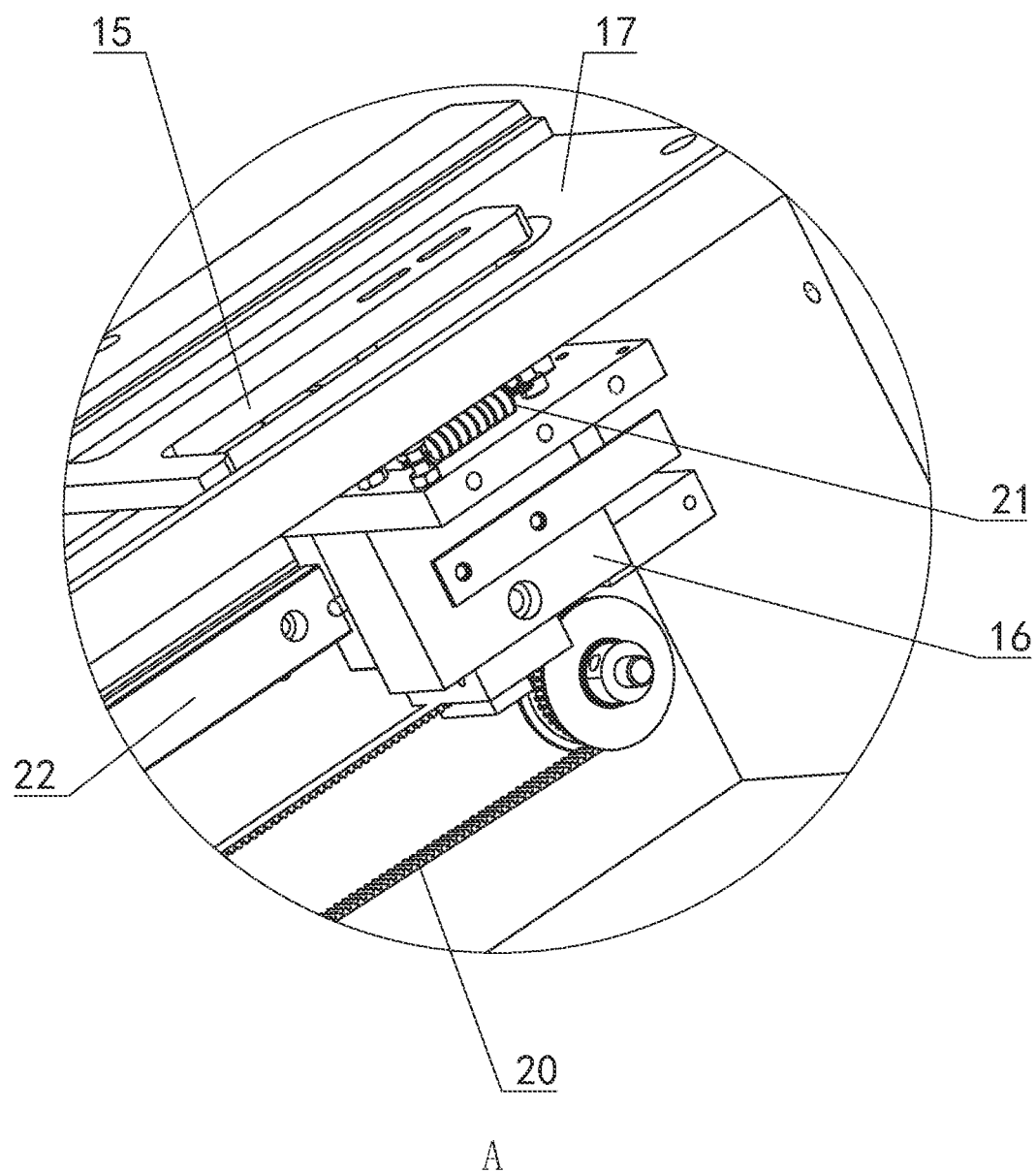
FIG. 4 is a partially enlarged view of part A in FIG. 3.
Figure 5:
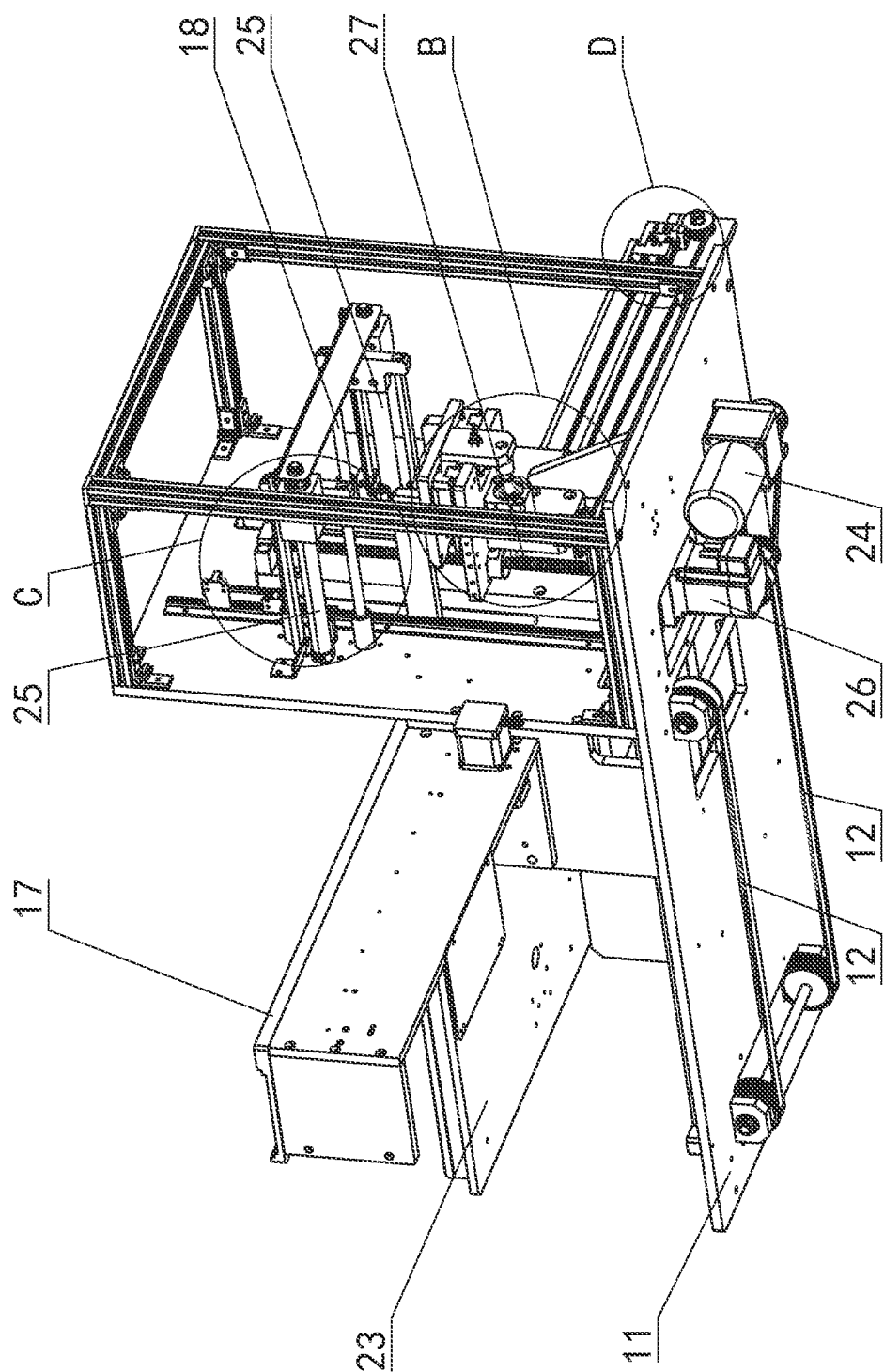
FIG. 5 is a three-dimensional schematic diagram of a feeding and discharging device in another viewing angle.

As shown in FIG. 3 to FIG. 5, the feeding and discharging device 2 includes a material sheet pushing-in device, a material sheet pushing-out device, and a material sheet positioning device; the material sheet pushing-in device and the material sheet pushing-out device are each arranged on two sides of the material sheet positioning device, and the material box pushing-in device and the material box pushing-out device are located on the same height; and a space for containing a material box is arranged between the material sheet pushing-out device and the material sheet positioning device. A pushing-in direction of the material sheet pushing-in device is parallel to a pushing-out direction of the material sheet pushing-out device.

The feeding and discharging device 2 further includes a material box feeding device, a material box jacking device, a material box bracket, and a material box pushing-out device; the material box jacking device is arranged in the space between the material sheet pushing-out device and the material sheet positioning device; the material box pushing-out device and the material box bracket are each arranged on two sides of the material box jacking device; the material box pushing-out device and the material box bracket directly face to each other; the material box feeding device is arranged on one side of the material box jacking device; the material box feeding device and the material box bracket are spaced apart from each other in a longitudinal direction; and the material box feeding device is arranged right below the material box bracket. A pushing-out direction of the material box pushing-out device is vertical to the pushing-out direction of the material sheet pushing-out device.

The material box feeding device includes a lower supporting plate 11 and a feeding power device arranged on the lower supporting plate 11, wherein the feeding power device includes a conveying motor 24 and a conveying synchronous belt 12. Conveying synchronous belt wheels are rotatably mounted at two ends of the lower supporting plate 11, and two ends of the conveying synchronous belt 12 are meshed with the conveying synchronous belt wheels on the corresponding sides. An output shaft of the conveying motor 24 is connected to any conveying synchronous belt wheel. A top of the conveying synchronous belt 12 protrudes upwards out of the lower supporting plate 11, thereby conveying the material box on the lower supporting plate 11 by the conveying synchronous belt 12.

There are two conveying synchronous belts 12 arranged side by side and spaced apart from each other. The conveying synchronous belt wheels of the two conveying synchronous belts 12 are connected by synchronous shafts, so that the two conveying synchronous belts 12 move synchronously and at the same speed. The two conveying synchronous belts 12 convey the material box through two ends of the material box, ensuring more stable conveying of the material box.

In this embodiment, the material box bracket is an upper supporting plate 23. The upper supporting plate 23 is arranged on an upper side of the lower supporting plate 11 at an interval, and the upper supporting plate 23 directly faces to the lower supporting plate 11. A material box containing material sheets to be welded is fed into the material box jacking device between the upper supporting plate 23 and the lower supporting plate 11, and a material box filled with welded material sheets is pushed out to the upper supporting plate 23 by the material box pushing-out device, thereby achieving continuous feeding and continuous discharging of the material sheets.

In order to ensure that the pushing of the material box on the upper supporting plate 23 is more stable, two limiting plates are arranged on an upper side of the upper supporting plate 23. The two limiting plates are arranged side by side and spaced apart from each other and a channel for guiding the material box is formed on the upper supporting plate 23 between the two limiting plates.

The material box is a rectangular box body with openings in two ends. Two opposite ends of the material box are opened, and outwards raised placement parts are arranged on inner walls of two opposite sides of the material box. The placement parts on the two sides are in one-to-one correspondence, and two sides of a material sheet are placed on the placement parts on the two sides. The material sheet pushing-out device and the material sheet pushing-in device are pushed out by the two ends of the material box.

The material sheet pushing-in device and the material sheet pushing-out device are each arranged on two opposite sides of the upper supporting plate 23, and the material sheet pushing-in device and material sheet pushing-out device directly faces to each other.

The material sheet positioning device includes a material sheet positioning groove 17 mounted on the upper supporting plate 23. An opening of the material sheet positioning groove 17 is arranged upwards. The material sheet pushing-in device and the material sheet positioning groove 17 are arranged on the same side of the upper supporting plate 23, and the material sheet pushing-out device is arranged on the other side of the upper supporting plate 23.

The material sheet pushing-in device includes a material sheet pushing-in power device, a material sheet pushing-in plate 15, and a pushing-in buffer device. The material sheet pushing-in plate 15 is slidably arranged in the material sheet positioning groove 17, and the material sheet pushing-in device is mounted on the material sheet positioning groove 17. The material sheet pushing-in plate 15 is connected to the material sheet pushing-in device, so that the material sheet pushing-in plate 15 moves back and forth along the material sheet positioning groove 17. In this embodiment, the material sheet pushing-in power device is arranged on a lower side of the material sheet positioning groove 17, and a long hole is formed in a bottom of the material sheet positioning groove 17, so as to facilitate connection between the material sheet pushing-in plate 15 and the material sheet pushing-in power device. The material sheet pushing-in plate 15 can slide relative to the material sheet pushing-in power device, with a sliding direction being the same as a movement direction of the material sheet pushing-in plate 15. The pushing-in buffer device is arranged between the material sheet pushing-in plate 15 and the material sheet pushing-in power device.

A horizontal material sheet pushing-in guide rail 22 is mounted on the material sheet positioning groove 17, and a material sheet pushing-in frame 16 is slidably mounted on the material sheet pushing-in guide rail 22. The material sheet pushing-in plate 15 is slidably connected to the material sheet pushing-in frame 16. The material sheet pushing-in frame 16 is connected to the material sheet pushing-in power device.

A top of the material sheet pushing-in frame 16 is provided with a pushing-in buffer guide rail. After a lower part of the material sheet pushing-in plate 15 passes through the long hole, the lower part can be slidably mounted on the pushing-in buffer guide rail. The pushing-in buffer guide rail is parallel to the movement direction of the material sheet pushing-in plate 15. In this embodiment, the pushing-in buffer device is a material sheet pushing-in spring 21, and two ends of the material sheet pushing-in spring 21 are connected to the material sheet pushing-in plate 15 and the material sheet pushing-in frame 16. When the material sheet pushing-in frame 16 moves in a direction close to the lower supporting plate 23, the material sheet pushing-in spring 21 pushes the material sheet pushing-in plate 15 to move, and the material sheet pushing-in spring 21 allows relative movement between the material sheet pushing-in plate 15 and the material sheet pushing-in frame 16, which can ensure that the material sheet is pushed in place and avoid damage to the material sheet.

The material sheet pushing-in power device includes a material sheet pushing-in motor and a material sheet pushing-in synchronous belt 20. The two ends of the material sheet positioning groove 17 can be rotatably provided with pushing-in synchronous belt wheels. Two ends of the material sheet pushing-in synchronous belt 20 are meshed with the pushing-in synchronous belt wheels on the corresponding sides. The material sheet pushing-in motor is mounted on the material sheet positioning groove 17, and an output shaft of the material sheet pushing-in motor is connected to any pushing-in synchronous belt wheel. The material sheet pushing-in frame 16 is connected to an upper side of the material sheet pushing-in synchronous belt 20.

The material sheet pushing-in power device can also directly use a linear module, and the material sheet pushing-in synchronous belt 20 can be replaced with a screw nut pair.

Figure 6:
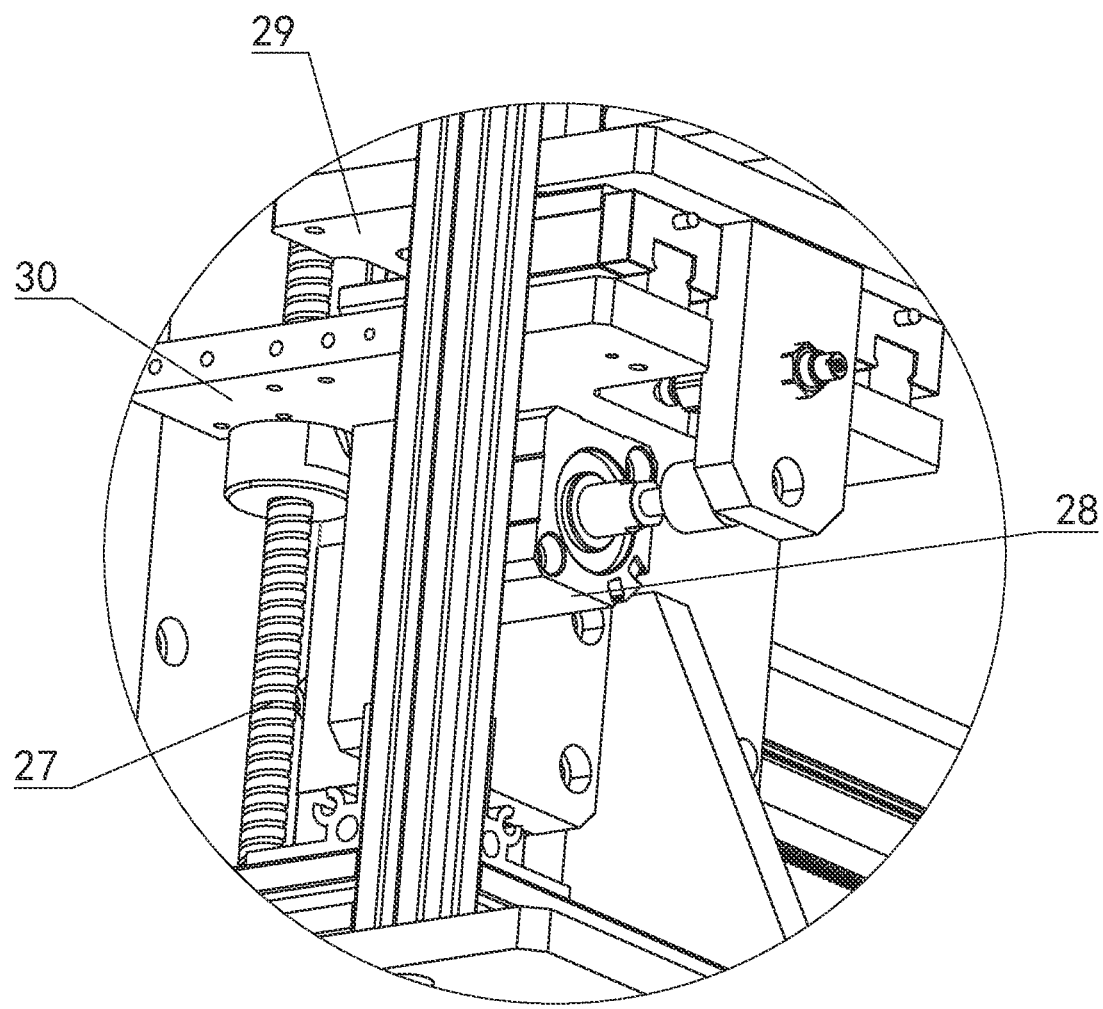
FIG. 6 is a partially enlarged view of part B in FIG. 5.

As shown in FIG. 3, FIG. 5, and FIG. 6, the material box jacking device includes a material box jacking power device, a jacking frame 19, and a pressing device. The jacking frame 19 is mounted on the stand 1 in a liftable manner. A bottom of the jacking frame 19 close to the upper supporting plate 23 protrudes outwards to form the material box supporting part. The material box supporting part is arranged at the bottom of the jacking frame 19. The pressing device is mounted at a top of the jacking frame 19, and the pressing device is arranged directly above the material box supporting part; and a cavity for containing a material box is arranged between the pressing device and the material box supporting part. The material box jacking power device is connected to the jacking frame 19 and pushes the jacking frame to rise and fall.

The pressing device includes a material box pressing cylinder 31 and a pressure plate 14. The material box pressing cylinder 31 is vertically mounted at the top of the jacking frame 19, and the pressure plate 14 is mounted on a piston rod of the material box pressing cylinder 31, and synchronously rises and falls with the piston rod of the material box pressing cylinder 31. The pressure plate 14 is arranged directly above the material box supporting part, and the material box pressing cylinder 31 pushes the pressure plate 14 to fall and presses the material box onto the material box supporting part.

The material box jacking power device includes a material box jacking motor 26 and a material box jacking screw rod 27. The material box jacking motor 26 is mounted on the stand 1, and the material box jacking screw rod 27 is vertically arranged. The material box jacking screw rod 27 is rotatably mounted on the stand 1. A piston rod of the material box jacking motor 26 is connected to the material box jacking screw rod 27 and drives the material box jacking screw rod 27 to rotate.

A vertical material box jacking guide rail is mounted on the stand 1; a jacking seat 30 is slidably mounted on the material box jacking guide rail; the jacking seat 30 is connected to the jacking frame 19 and drives the jacking frame to rise and fall. The material box jacking screw rod 27 is in threaded connection to the jacking seat 30, and then the jacking frame 19 is driven to rise and fall through the jacking seat 30.

The material box jacking power device can also be a linear module, and the material box jacking screw rod 27 can also be replaced with a synchronous belt.

The feeding and discharging device 2 also includes an adjustment device. The adjustment device is arranged between the jacking seat 30 and the jacking frame 19. The jacking frame 19 is slidably connected to the jacking seat 30, and a sliding direction is perpendicular to the movement direction of the material sheet pushing-in plate 15, so as to adjust a position of the material box, so that the material box directly faces to the material sheet pushing-in plate 15 and the material sheet pushing-out device.

The adjustment device includes an adjustment cylinder 28, and the adjustment cylinder 28 is mounted on the jacking seat 30. A piston rod of the adjustment cylinder 28 is connected to the jacking frame 19 and drives the jacking frame to move horizontally. Specifically, a horizontal adjustment guide rail is mounted on an upper side of the jacking seat 30, and an adjustment frame 29 is slidably mounted on the adjustment guide rail. The piston rod of the adjustment cylinder 28 is connected to the adjustment frame 29, and the jacking frame 19 is fixedly connected to the adjustment frame 29, so as to ensure more stable and reliable adjustment for the jacking frame 19.

Figure 7:
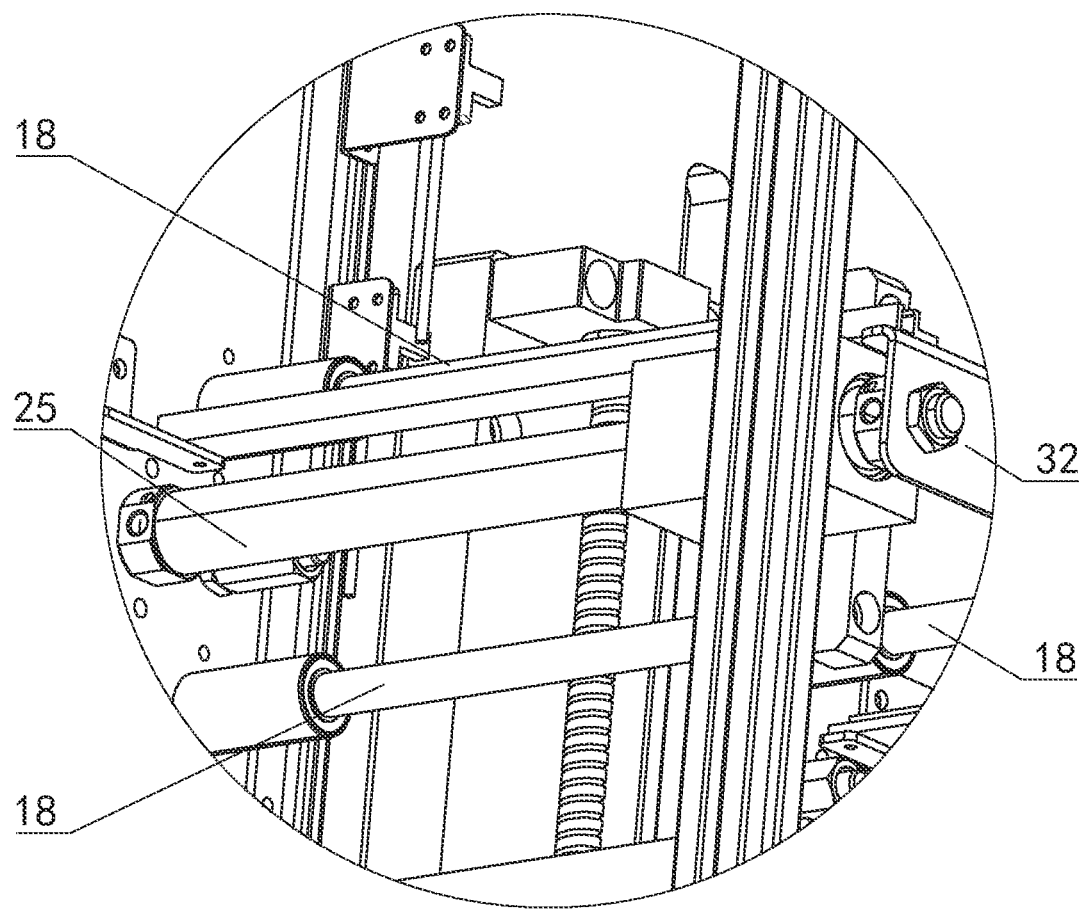
FIG. 7 is a partially enlarged view of part C in FIG. 5.

As shown in FIG. 3, FIG. 5, and FIG. 7, the material box pushing-out device includes a material box pushing-out power device and material box push rods 18. The material box push rods 18 are horizontally arranged, and the material box push rods 18 are higher than the upper supporting plate 23. Two material box push rods 18 are arranged on each of two sides of the jacking frame 19, so that the material box on the jacking frame 19 is pushed onto the upper supporting plate 23 through the two ends of the material box. The material box pushing-out power device is simultaneously connected to the various material box push rods 18 and drives the material box push rods to move.

The material box pushing-out device further includes a material box pushing frame 32. The various material box pushing rods 18 are simultaneously fixedly connected to the material box pushing frame 32 and move synchronously with the material box pushing frame 32. The material box pushing-out power device is connected to the material box pushing frame 32 and drives the material box pushing frame 32 to move, thereby achieving synchronous movements of the various material box pushing rods 18. In this embodiment, the material box pushing-out power device is a material box pushing cylinder 25, and the material box pushing-out power device can also be achieved using a linear module.

Figure 8:
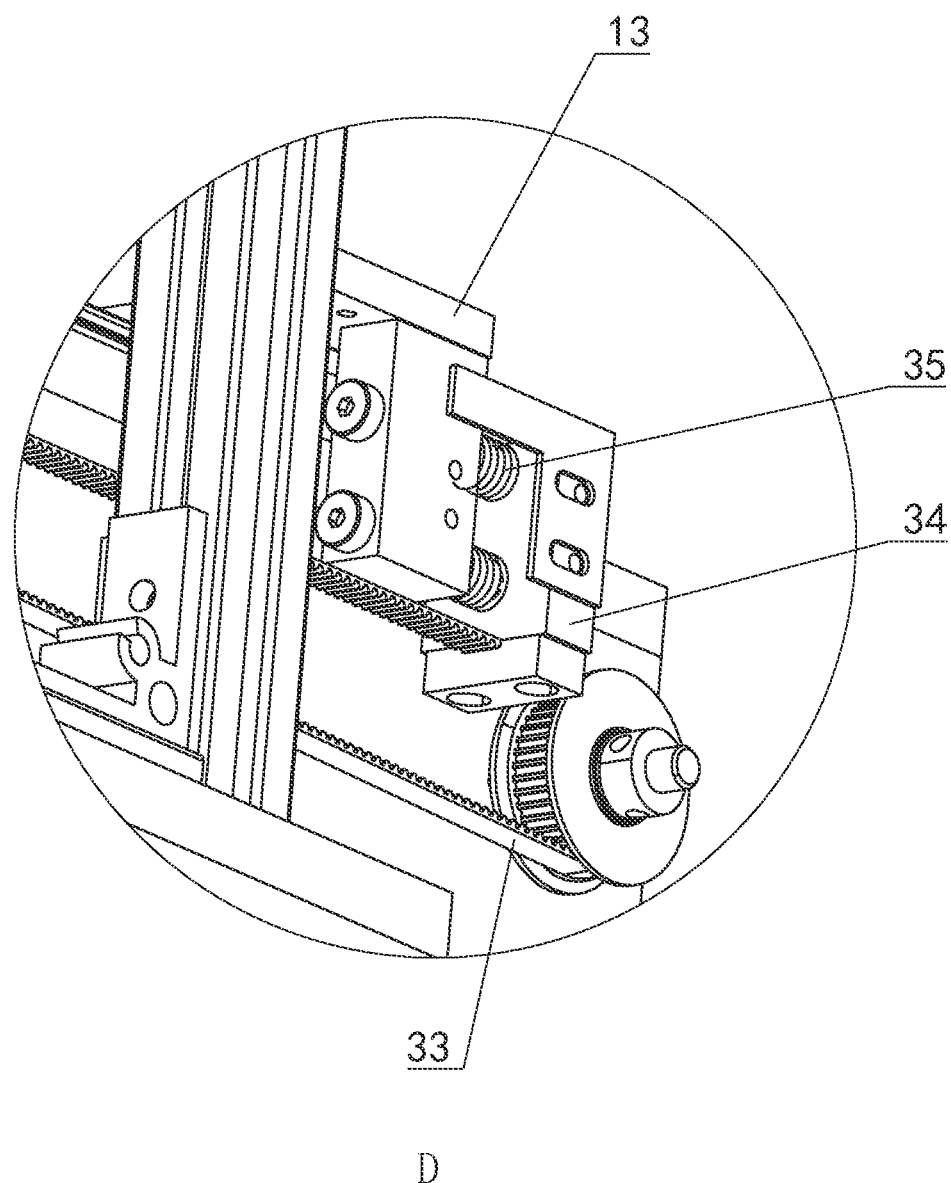
FIG. 8 is a partially enlarged view of part D in FIG. 5.

As shown in FIG. 3, FIG. 5, and FIG. 8, the material sheet pushing-out device includes a material sheet pushing-out plate 13, a pushing-out buffer device, and a material sheet pushing-out power device. The material sheet pushing-out plate 13 directly faces to the material sheet pushing-out positioning groove 17, and the material sheet pushing-out plate 13 is slidably mounted on the upper supporting plate 23. The material sheet pushing-out power device is connected to the material sheet pushing-out plate 13 and drives the material sheet pushing-out plate to move back and forth in a direction close to or away from the material sheet positioning groove 17. The material sheet pushing-out plate 13 can slide relative to the material sheet pushing-out power device, with a sliding direction being the same as a movement direction of the material sheet pushing-out plate 13. The pushing-out buffer device is arranged between the material sheet pushing-out plate 13 and the material sheet pushing-out power device. The material sheet pushing-out plate 13 directly faces to the material sheet pushing-in plate 15.

The upper supporting plate 23 is provided with a material sheet pushing-out guide rail; a material sheet pushing-out frame 34 is slidably mounted on the material sheet pushing-out guide rail; the material sheet pushing-out frame 34 is connected to the material sheet pushing-out power device; the material sheet pushing-out plate 13 is mounted on the material sheet pushing-out frame 34; and the pushing-out buffer device is arranged between the material sheet pushing-out plate 13 and the material sheet pushing-out frame 34.

In this embodiment, the pushing-out buffer device is a material sheet pushing-out spring 35, and a guide shaft is mounted on the material sheet pushing-out frame 34. The material sheet pushing-out plate 13 is slidably connected to the guide shaft; the material sheet pushing-out spring 35 sleeves the guide shaft; and two ends of the material sheet pushing-out spring 35 are connected to the material sheet pushing-out plate 13 and the material sheet pushing-out frame 34, which can ensure that the material sheet is pushed in place and avoid damage to the material sheet.

The material sheet pushing-out power device includes a material sheet pushing-out motor and a material sheet pushing-out synchronous belt 33. Two pushing-out synchronous belt wheels are rotatably mounted on the upper support plate 23, and the two pushing-out synchronous belt wheels are arranged at two ends of the material sheet pushing-out guide rail. Two ends of the material sheet pushing-out synchronous belt 33 are connected to the two pushing-out synchronous belt wheels, and an output shaft of the material sheet pushing-out motor is connected to any one of the pushing-out synchronous belt wheels. The material sheet pushing-out frame 34 is fixedly connected to an upper side of the material sheet pushing-out synchronous belt 33.

The material sheet pushing-out power device can also directly use a cylinder or a linear module, and the material sheet pushing-out synchronous belt 33 can be replaced with a screw nut pair.

When the material sheet is pushed out of a trough, the material sheet pushing-out motor drives the material sheet pushing-out plate 13 to move through the material sheet pushing-out synchronous belt 33. The material sheet pushing-out plate 13 extends into the material box and pushes the corresponding material sheet into the material sheet positioning groove 17 until an end portion of the material sheet is positioned on the material sheet pushing-in plate 15. Due to the existence of the material sheet pushing-out spring 35, damage to the material sheet can be avoided.

Figure 9:
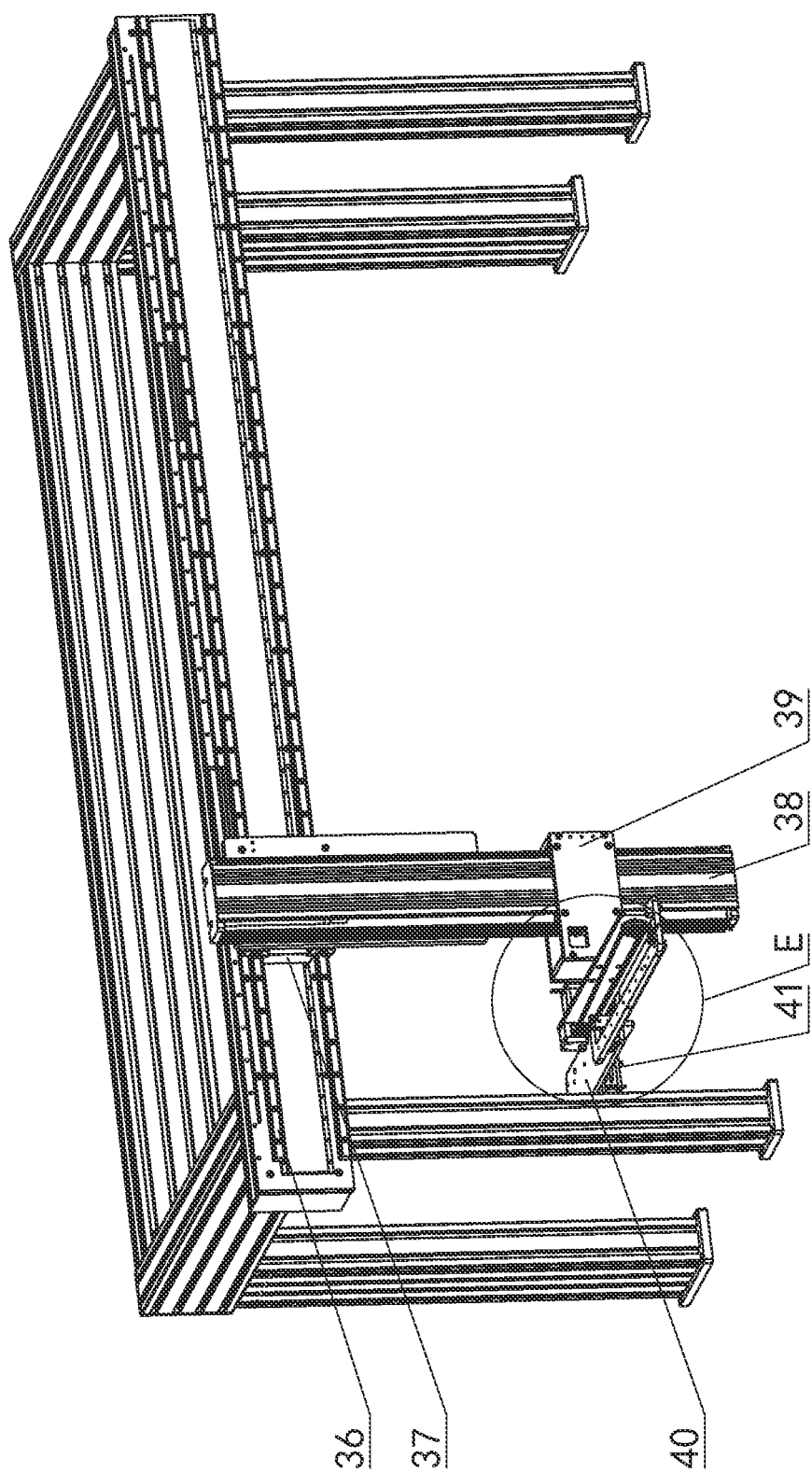
FIG. 9 is a three-dimensional schematic diagram of a transfer device.
Figure 10:
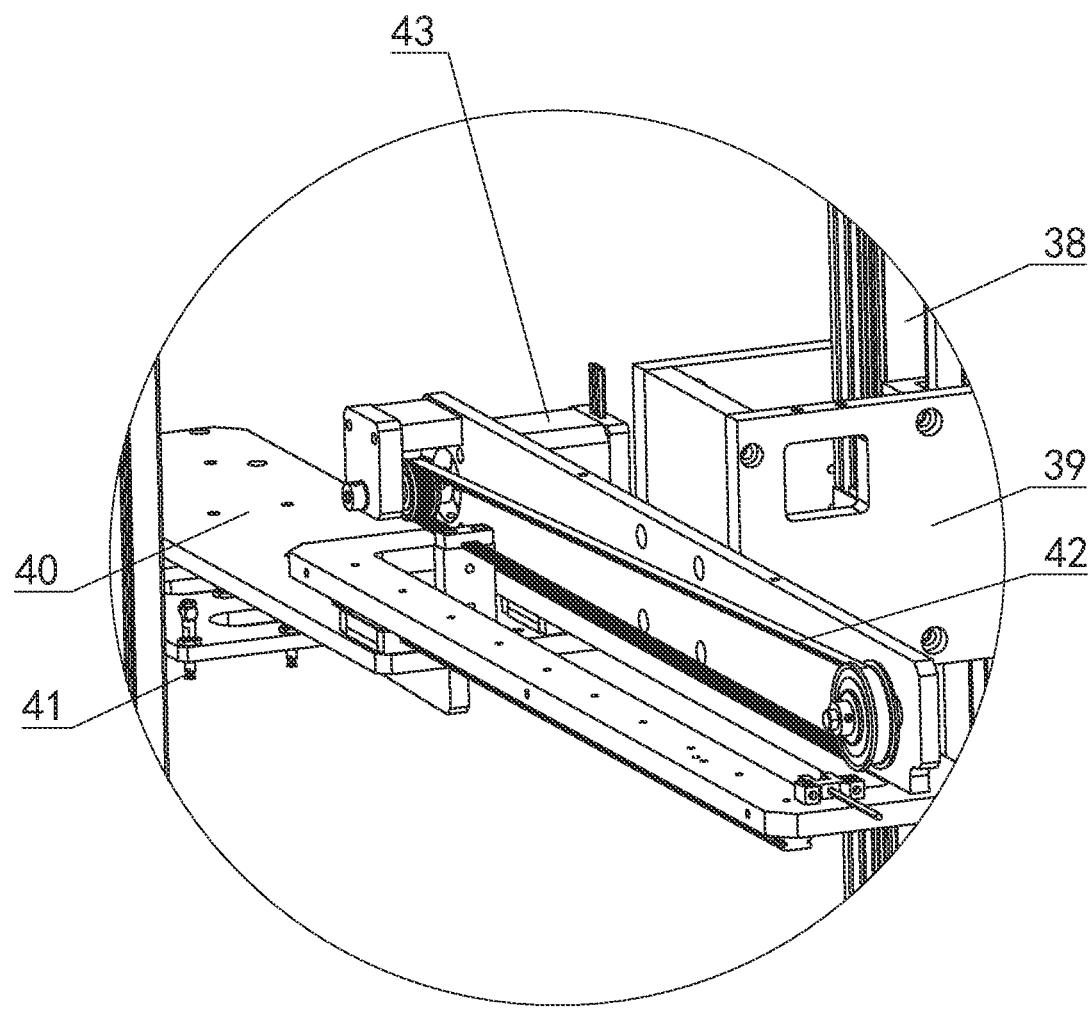
FIG. 10 is a partially enlarged view of part E in FIG. 9.

As shown in FIG. 9 to FIG. 10, the transfer device 3 includes a translation device, a lifting device, an expansion and retraction device, and a suction device. The translation device is mounted on the stand 1; the lifting device is mounted on the translation device and moves back and forth between the feeding and discharging device 2 and all the groups of welding chambers; the expansion and retraction device is mounted on the lifting device and rises and falls with the lifting device. The suction device is mounted on the expansion and retraction device and moves horizontally with the expansion and retraction device. A movement direction of the expansion and retraction device is perpendicular to a movement direction of the translation device.

The translation device includes a translation power device and a translation frame 37. A horizontal translation guide rail 36 is mounted on the stand 1; the translation frame 37 is slidably mounted on the translation guide rail 36; the translation power device is mounted on the stand 1; and the translation power device is connected to the translation frame 37 and drives the translation frame to move horizontally. The translation power device is a linear module, and a motor can also be used to drive the translation frame 37 to move through a synchronous belt.

The lifting device includes a lifting power device and a lifting frame 39. The lifting frame 39 is slidably mounted on the translation frame 37, and the lifting power device is connected to the lifting frame 39 and drives the lifting frame to rise and fall. In this embodiment, a vertical column 38 is mounted on the translation frame 37, and the lifting frame 39 is slidably mounted on the vertical column 38. The lifting power device is a linear module, and a motor can also be used to drive the lifting frame 39 to rise and fall through a synchronous belt.

The expansion and retraction device includes an expansion and retraction power device and an expansion and retraction frame 40. The expansion and retraction frame 40 is slidably mounted on the lifting frame 39, and the expansion and retraction power device is connected to the expansion and retraction frame 40 and drives the expansion and retraction frame to move horizontally.

The expansion and retraction power device includes an expansion and retraction driving motor 43 and an expansion and retraction synchronous belt 42. Two ends of the lifting frame 39 are rotatably provided with expansion and retraction synchronous belt wheels. Two ends of the expansion and retraction synchronous belt 42 are connected to the two expansion and retraction synchronous belt wheels. The expansion and retraction driving motor 43 is mounted on the lifting frame 39, and an output shaft of the expansion and retraction driving motor 43 is connected to any one of the expansion and retraction synchronous belt wheels. The expansion and retraction frame 40 is fixedly connected to one side of the expansion and retraction synchronous belt 42. The expansion and retraction power device can also use a linear module, and the expansion and retraction synchronous belt 42 can also be replaced with a screw nut pair.

The suction device includes a suction frame and a plurality of suction nozzles 41. The suction frame is mounted on a lower side of the expansion and retraction frame 40, and the suction nozzle 41 is mounted at a bottom of the suction frame. The suction nozzles 41 are arranged side by side and spaced apart from each other, so as to transfer the material sheet.

Figure 11:
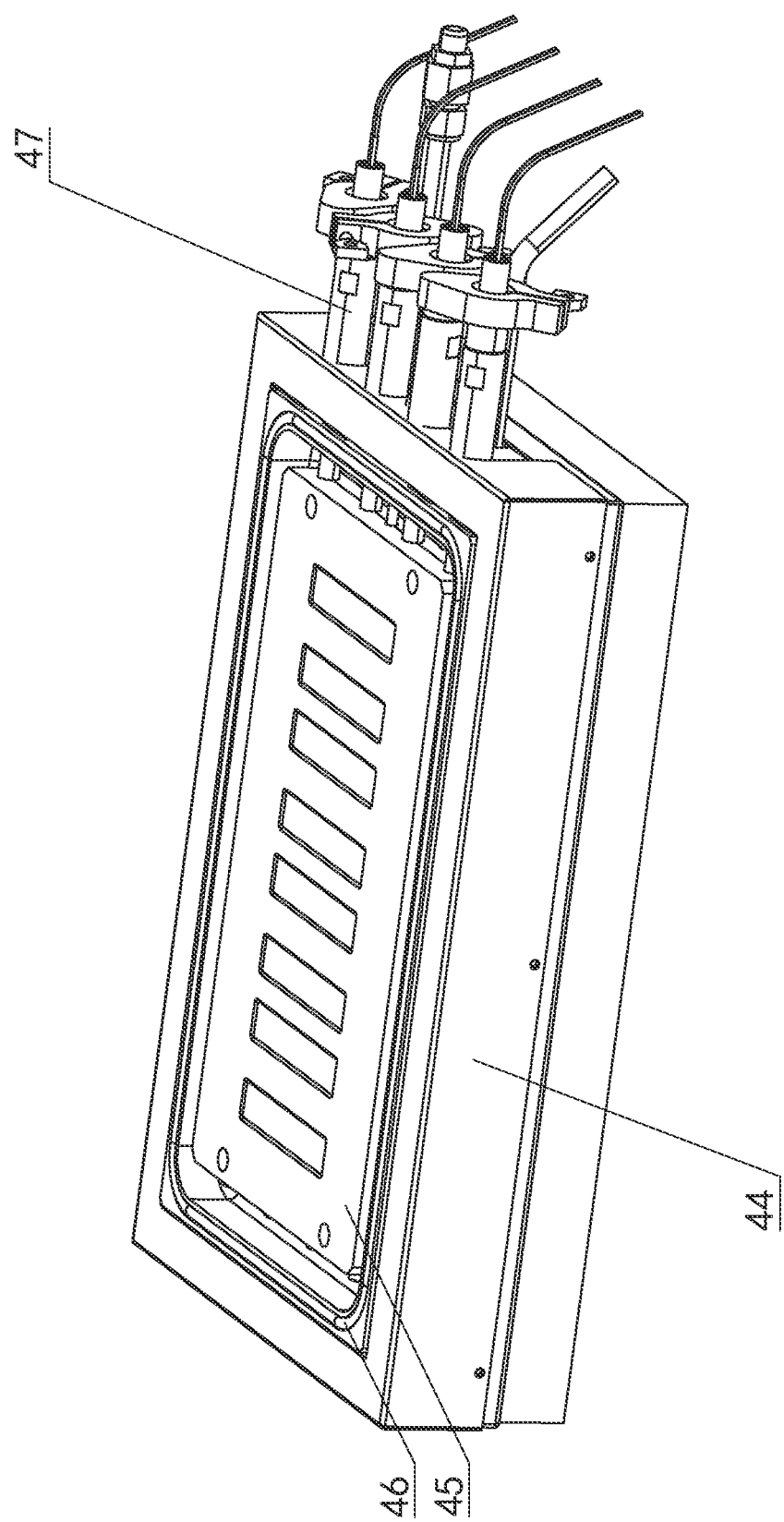
FIG. 11 is a three-dimensional schematic diagram of a welding chamber base.
Figure 12:
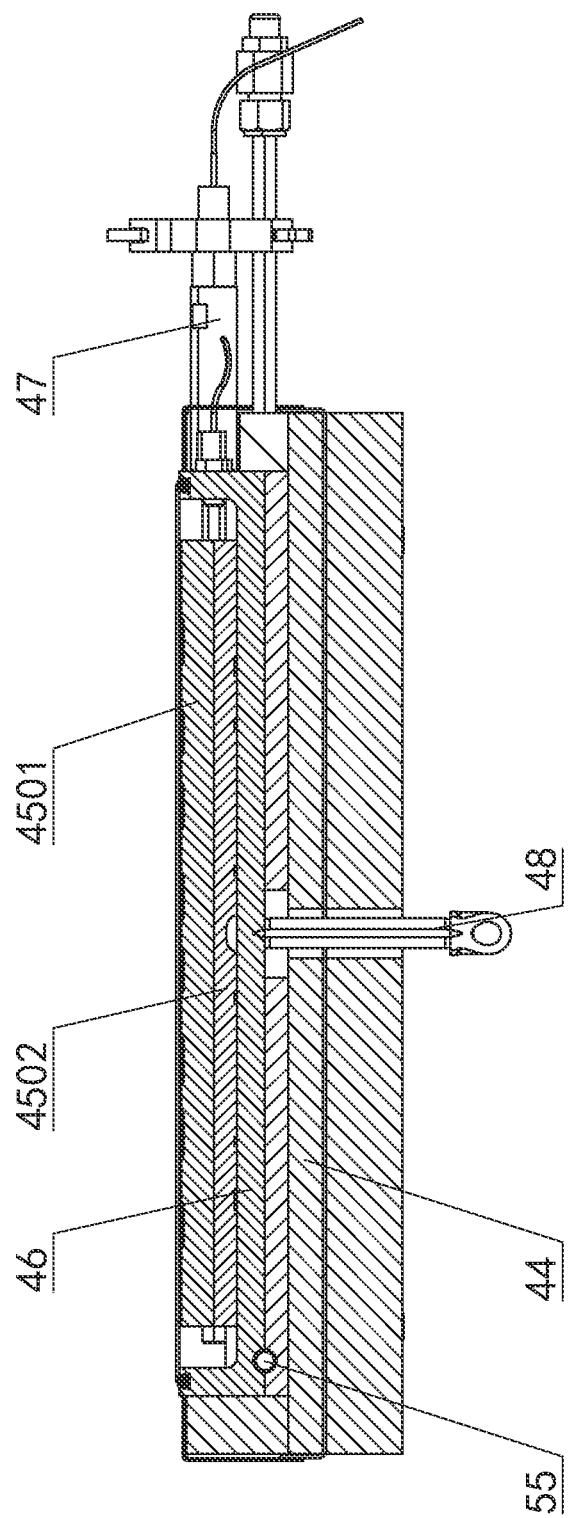
FIG. 12 is a schematic diagram of a front cross-sectional view of a welding chamber base.

As shown in FIG. 11 to FIG. 12, the welding chamber base 9 includes a thermal protection shield 44 and a support plate 45. A base main body 46 is arranged inside the thermal protection shield 44, and a lower mounting cavity with an upwards opening is arranged at a top of the base main body 46. The thermal protection shield 44 is cuboid, and the support plate 45 is arranged inside the base main body 46. A bottom of the support plate 45 is supported at a bottom of the base main body 46 and is detachably connected to the base main body 46. A side part of the support plate 45 is spaced apart from an inner wall of the base main body 46. A top of the base main body 46 is provided with a sealing ring, and the sealing ring is arranged around the lower mounting cavity.

The lower heating device includes a plurality of heating pipes 47 arranged inside the support plate 45, and the heating pipes 47 are arranged in a lengthwise direction of the support plate 45. The heating pipes 47 are arranged side by side in a width direction of the support plate 45 and spaced apart from each other. In this embodiment, the heating pipes 47 are arranged side by side in the width direction of the support plate 45 and spaced apart from each other. A temperature sensor is also arranged inside the support plate 45, and the temperature sensor is arranged between two heating pipes 47, so as to detect a temperature of the support plate 45 in real time and reflect a temperature of the material sheet based on the temperature of the support plate 45.

Further, the support plate 45 includes an outer plate 4501 and an inner plate 4502. The outer plate 4501 is arranged on an upper side of the inner plate 4502, and the outer plate 4501 is detachably connected to the inner plate 4502. The temperature sensor and the heating pipe 47 are both located between the outer plate 4501 and the inner plate 4502 to facilitate mounting and removal of the heating pipes 47.

A lower groove is arranged at the bottom of the base main body 46, and an upper groove is arranged on an inner wall of a bottom of the thermal protection shield 44. The lower groove and the upper groove are enclosed to form a lower cooling channel 55. The lower cooling channel 55 is rotatably arranged in the welding chamber base 9 to enlarge a cooling area and ensure uniform cooling of the material sheet.

Figure 13:
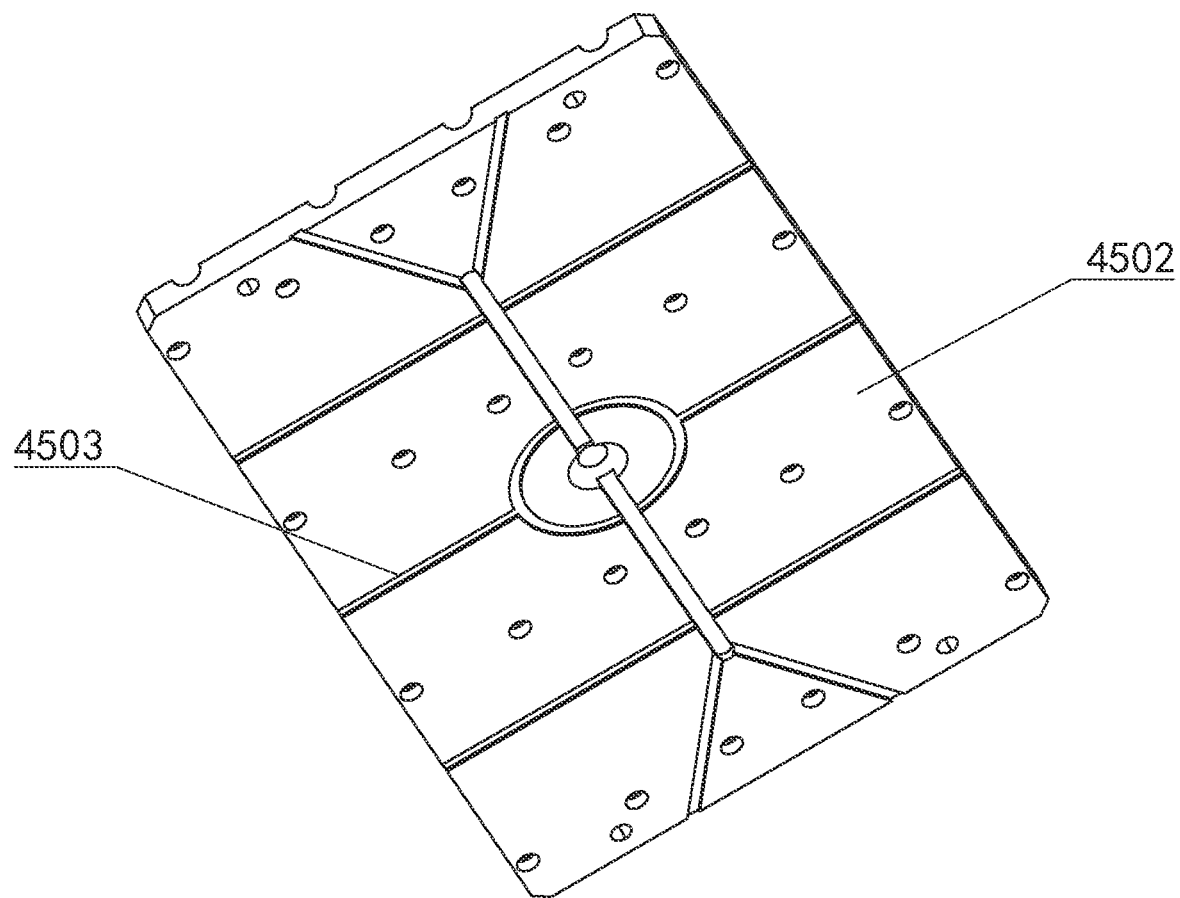
FIG. 13 is a three-dimensional schematic diagram of an inner plate.

As shown in FIG. 12 to FIG. 13, a plurality of air inlet slots 4503 are arranged at the bottom of the support plate 45, namely a bottom of the inner plate 4502. The bottom of the support plate 45 abuts against the base main body 46, so that the air inlet slots 4503 are enclosed with the bottom of the base main body to form a plurality of air inlet channels.

The various welding chambers are also connected to a protective gas inlet device. The protective gas inlet device includes an air inlet pipe 48. Delivery outlets of the air inlet pipes 48 are simultaneously connected to delivery inlets of the various air inlet channels through the thermal protection shield 44 and the base main body 46. Delivery outlets of the various air inlet channels are arranged around the support plate 45 to communicate the air inlet channels to a space between and the support plate 45 and the base main body 46, thereby ensuring that nitrogen can enter the welding cavities uniformly.

Figure 14:
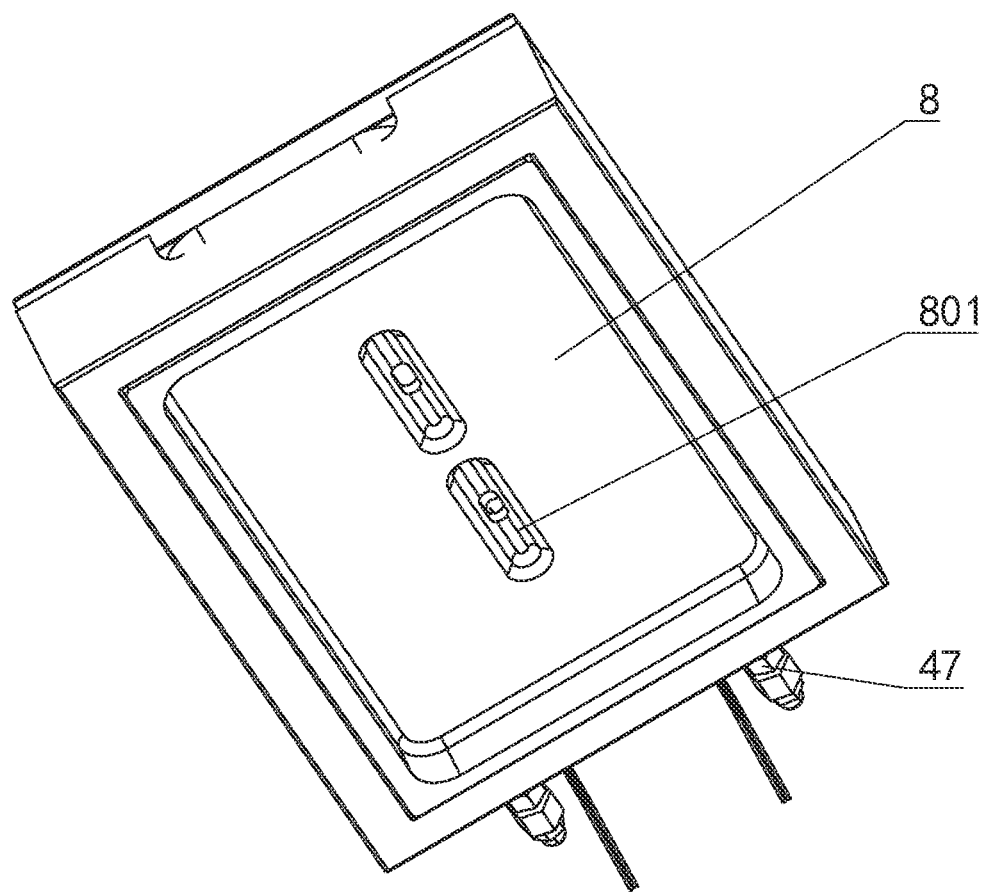
FIG. 14 is a three-dimensional schematic diagram of a welding chamber top cover.

As shown in FIG. 14, the structure of the welding chamber top cover 8 is the same as that of the welding chamber base 9, with the only difference being that there is no support plate 45 inside the welding chamber top cover 8. The structure of the welding chamber top cover 8 will not be elaborated here.

A top of the welding chamber top cover 8 is provided with an air suction port 801, and the air suction port 801 is communicated to the condensing assembly 6 to achieve vacuumization in the welding chambers. The air suction port 801 penetrates through the thermal protection shield 44 of the welding chamber top cover 8 and a top cover main body, and is communicated to an upper mounting cavity inside the top cover main body.

When the welding chamber top cover 8 is fastened to an upper side of the welding chamber base 9, the upper mounting cavity and the lower mounting cavity are enclosed to form the welding cavity. An edge of the top cover main body compresses an edge of the base main body 46, and the top cover main body and the base main body 46 cooperate with each other to squeeze the sealing ring, so as to ensure a good sealing effect between the welding chamber top cover 8 and the welding chamber base 9.

The upper heating device includes two heating pipes 47 arranged inside the top cover main body; the heating pipes 47 are arranged in a lengthwise direction of the top cover main body; and the heating pipes 47 are arranged side by side in a width direction of the top cover main body and spaced apart from each other. The upper cooling channel is arranged between the top cover main body and the thermal protection shield 44 of the welding chamber top cover 8.

Figure 15:
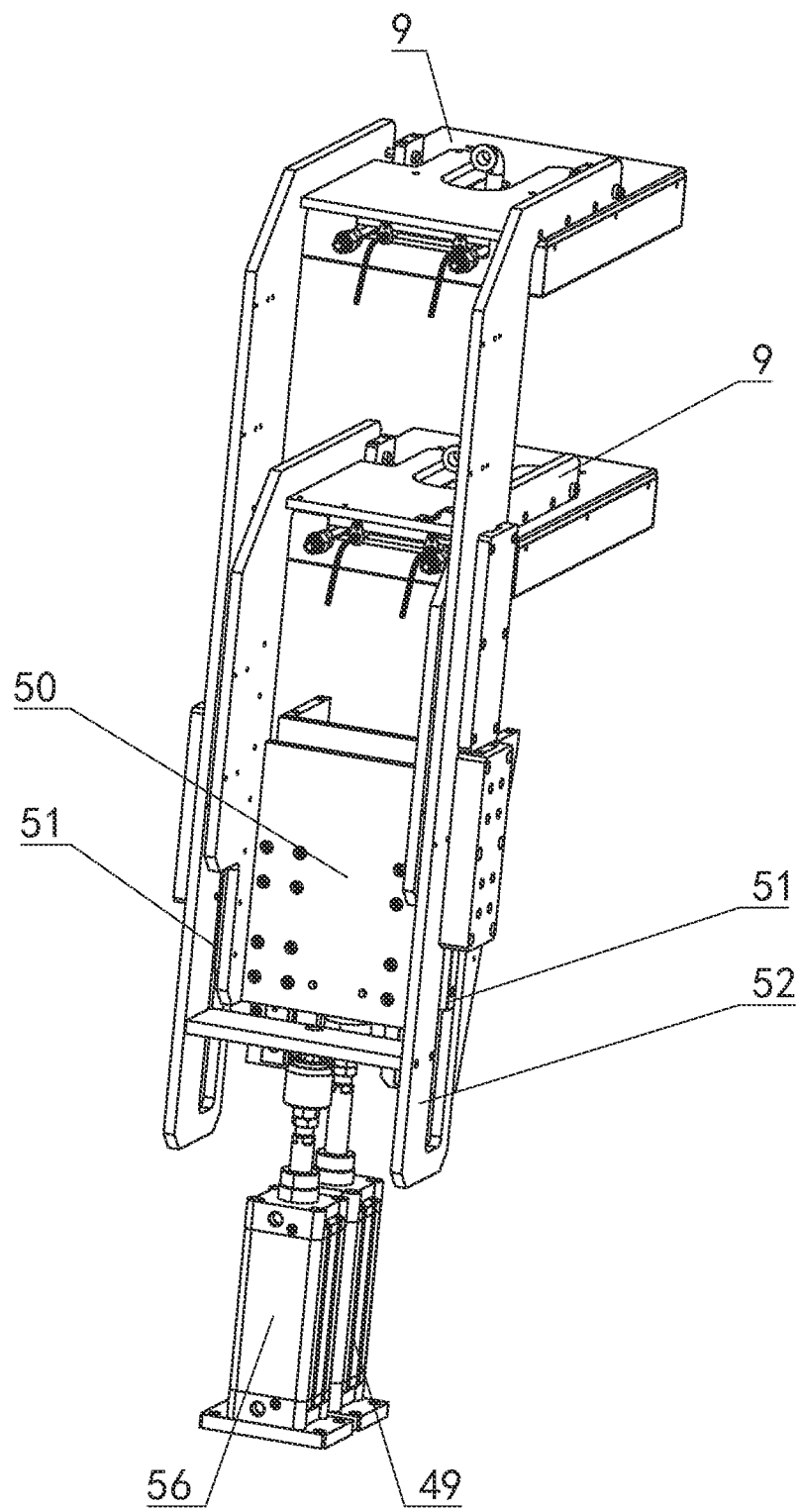
FIG. 15 is a three-dimensional schematic diagram of a cover closing device.
Figure 16:
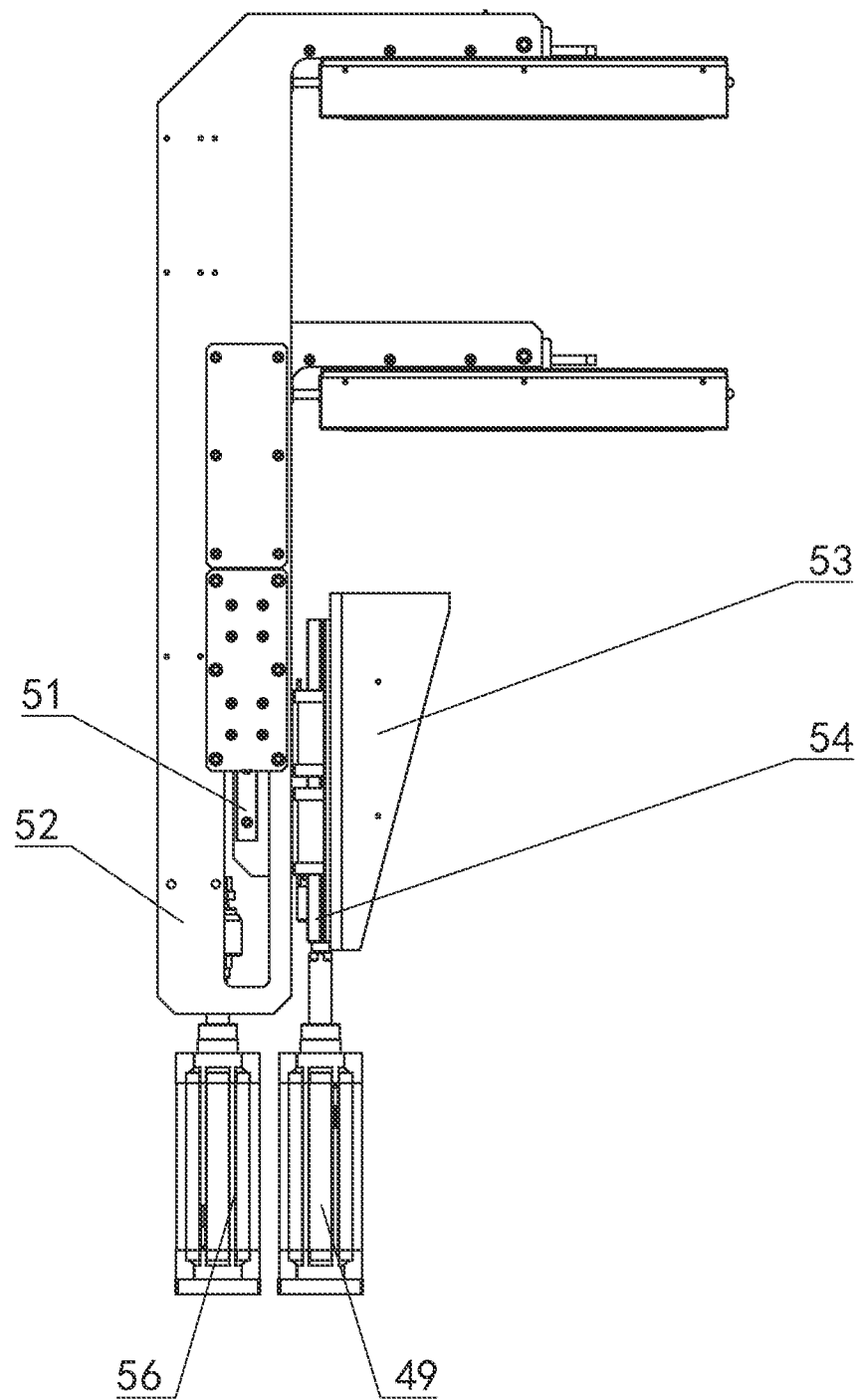
FIG. 16 is a schematic diagram of a left view of a cover closing device.

As shown in FIG. 15 to FIG. 16: In this embodiment, each cover closing device 5 includes a first cover closing device and a second cover closing device. The welding chamber top covers 8 of the two welding chambers in the same group are connected to the first cover closing device and the second cover closing device, so that the two welding chamber top covers 8 in the same group can rise and fall independently.

The first cover closing device includes a first cover closing cylinder 49 and a first cover closing frame 50. A mounting seat 53 is arranged on the stand 1; the mounting seat 53 is arranged directly below a corresponding group of welding chambers; two vertical first cover closing guide rails 54 are arranged on the mounting seat 53, and the first cover closing guide rails 54 are arranged side by side and spaced apart from each other; the first cover closing frame 50 is arranged on one side of the mounting seat 53, and the first cover closing frame 50 is slidably mounted on the first cover closing guide rails 54; the first cover closing cylinder 49 is vertically mounted on the stand 1; a piston rod of the first cover closing cylinder 49 is connected to the first cover closing frame 50 and pushes the first cover closing frame 50 to rise and fall.

First connecting plates are arranged on two sides of the first cover closing frame 50. The two first connecting plates are spaced apart from each other. Lower ends of the two first connecting plates are fixedly connected to the first cover closing frame 50, and upper ends of the two first connecting plates are bent in a direction close to the welding chambers and are connected to the welding chamber top cover 8 of the welding chamber located on the upper side. The welding chamber top cover 8 is located between the two first connecting plates, so that the welding chamber top cover 8 rises and falls synchronously with the first connecting plates.

The second cover closing device includes a second cover closing frame 52 and a second cover closing cylinder 56. Vertical second cover closing guide rails 51 are mounted on inner sides of the two first connecting plates of the first cover closing frame 50. The second cover closing frame 52 is arranged between the two first connecting plates, and two sides of the second cover closing frame 52 are slidably connected to the second cover closing guide rails 51 on the corresponding sides. Two second connecting plates are arranged on an upper side of the second cover closing frame 52. The second connecting plates are arranged side by side and spaced apart from each other. Upper ends of the two second connecting plates are bent in the direction close to the welding chambers. The welding chamber top cover 8 of the welding chamber located on the lower side is fixedly connected to the upper ends of the second connecting plates, and the welding chamber top cover 8 is located between the two second connecting plates, so that the welding chamber top cover 8 can rise and fall synchronously with the two second connecting plates.

As shown in FIG. 17, the condensing assembly 6 includes a separation pipe 57 and a collection bottle 58. A delivery inlet and a delivery outlet of the separation pipe 57 are both arranged on side parts; the delivery inlet of the separation pipe 57 is communicated to the welding cavities of the welding chambers, and the delivery outlet of the separation pipe 57 is communicated to a delivery inlet of the filtering assembly 7. The collection bottle 58 is arranged on a lower side of the separation pipe 57, and a top of the collection bottle 58 is communicated to a bottom of the separation pipe 57. The top of the collection bottle 58 is sealed with the bottom of the separation pipe 57, and a top of the separation pipe 57 is closed.

During vacuuming of the welding chambers, gas enters the separation pipe 57. At this time, liquid enters the collection bottle 58 under the action of the gravity, which achieves gas-liquid separation.

A working process of the static vacuum welding furnace is as follows: The material sheets to be welded are placed inside the material box. The conveying motor 24 conveys the material box to the upper side of the material box supporting part of the jacking frame 19 through the conveying synchronous belt 12. The material box pressing cylinder 31 pushes the pressure plate 14 to move downwards and presses the material box on the material box supporting part.

The material box jacking motor 26 drives the jacking seat 30 to rise through the material box jacking screw rod 27, and the jacking frame 19 rises synchronously with the jacking seat 30 until the material sheet on the topmost side of the material box is aligned with the material sheet positioning groove 17. In this case, the adjustment cylinder 28 drives the adjustment frame 29 to move to adjust the position of the jacking frame 19, which ensures that the material sheets in the material box are aligned with the material sheet positioning groove 17.

The material sheet pushing-out motor drives the material sheet pushing-out plate 13 to move through the material sheet pushing-out synchronous belt 33. The material sheet pushing-out plate 13 pushes the material sheet from the material box into the material sheet positioning groove 17 through the end portions of the material sheets, until the end portions of the material sheets are supported on the material sheet pushing-in plate 15. In this case, the material sheet pushing-out motor drives the material sheet pushing-out plate 13 to be reset.

The suction nozzle 41 of the transfer device 3 sucks the material sheets in the material sheet positioning groove 17 and transfers the material sheets into the welding chambers. Meanwhile, the material box jacking motor 26 drives the jacking seat 30 to rise through the material box jacking screw rod 27, so as to drive the jacking frame 19 to rise a specified distance, which aligns the material sheet the topmost side of the material box with the material sheet positioning groove 17 again. This process is repeated until all the material sheets in the material box are fed into the welding chambers.

The material sheets to be welded are put onto the support plates 45 of the welding chambers; then the lifting device drives the welding chamber top covers 8 to move downwards and be fastened on the welding chamber bases 9.

Nitrogen is injected into the welding chambers through the air inlet pipe 48, and the upper cooling channels and the lower cooling channels 55 are communicated to the circulating water tank 4 through the balance pipe. The stop valves between the air suction ports 801 and the condensing assembly 6 are also closed. The heating pipes 47 heat the welding chambers until the welding chambers reach a specified temperature.

The stop valve on the air inlet pipe 48 closes the air inlet pipe 48. In this way, the welding chambers are vacuumized through the vacuum pump to weld a workpiece.

After the welding is completed, the stop valves between the upper cooling channels, as well as the lower cooling channels 55, and the balance pipe are closed, and the cooling pump transports the circulating water into the upper cooling channels and the lower cooling channels 55 to cool the welding chambers.

The transfer device transports the welded material sheets into the material sheet positioning groove 17. The material sheet pushing-in motor pushes the material sheets in the material sheet positioning groove 17 into the material box through the material sheet pushing-in synchronous belt 20. Then, the material box jacking motor 26 drives the jacking seat 30 to move downwards for a certain distance through the material box jacking screw rod 27. The jacking frame 19 moves synchronously and makes the material box fall a certain distance, so that the empty placement parts on the two sides of the material box are aligned with the material sheet positioning groove 17 again to receive the material sheets in the material sheet positioning groove 17 again.

After the material box is filled with the welded material sheets, the material box jacking motor 26 drives the jacking seat 30 to rise through the material box jacking screw rod 27, so that the material box is driven by the jacking frame 19 to move upwards to be aligned with the upper supporting plate 23. Meanwhile, the material box pressing cylinder 31 drives the pressure plate 14 to move upwards and release the pressure on the material box. In this case, the material box pushing cylinder 25 drives the material box pushing frame 32 to move, thus driving the various material box push rods 18 to move, so that the material box push rods 18 push the material box on the jacking frame 19 onto the upper supporting plate 23.

The above only describes preferred embodiments of the present invention and is not a limitation on any other forms of the present invention. Any person skilled in the art may use the disclosed technical content to transform or modify the above embodiments into equivalent embodiments with equivalent changes. However, any simple modifications, equivalent changes, and transformations made to the above embodiments based on the technical essence of the present invention without departing from the contents of the technical solutions of the present invention still fall within the protection scope of the technical solutions of the present invention.

What is claimed is:

1. A static vacuum welding furnace, comprising: a feeding and discharging device, a transfer device, a plurality of welding chambers, and cover closing devices, wherein the welding chambers are arranged side by side at intervals; the cover closing devices are connected to the welding chambers and drive the welding chambers to be opened or closed; the feeding and discharging device is arranged on one sides of the welding chambers; the transfer device is arranged between the feeding and discharging device and all the welding chambers; all the welding chambers are connected with heating devices and cooling devices;

the feeding and discharging device comprises a material sheet pushing-in device, a material sheet pushing-out device, and a material sheet positioning device; the material sheet pushing-in device and the material sheet pushing-out device are each arranged on two sides of the material sheet positioning device; and a space for containing a material box is arranged between the material sheet pushing-out device and the material sheet positioning device;

the material sheet pushing-out device comprises a material sheet pushing-out plate, a pushing-out buffer device, and a material sheet pushing-out power device; the material sheet pushing-out plate is connected to the material sheet pushing-out power device, and the material sheet pushing-out plate moves in a direction close to or away from material sheet positioning device; and the pushing-out buffer device is arranged between the material sheet pushing-out plate and the material sheet pushing-out power device;

the material sheet positioning device comprises a material sheet positioning groove, and an opening of the material sheet positioning groove faces upwards;

the feeding and discharging device further comprises a material box feeding device, a material box jacking device, a material box bracket, and a material box pushing-out device; the material box jacking device is arranged in a space; the material box pushing-out device and the material box bracket are each arranged on two sides of the material box jacking device; the material box pushing-out device and the material box bracket directly face to each other; the material box feeding device is arranged on one side of the material box jacking device; and the material box feeding device and the material box bracket are spaced apart from each other in a longitudinal direction;

the material box jacking device comprises a material box jacking power device, a jacking frame, and a pressing device; the material box jacking power device is connected to the jacking frame and drives the jacking frame to rise and fall; a bottom of the jacking frame is provided with a material box supporting part; the pressing device is mounted at a top of the jacking frame; and the pressing device directly faces to the material box supporting part; and the material box pushing-out device comprises a plurality of material box push rods and a material box pushing-out power device; the plurality of material box push rods are arranged side by side; the material box pushing-out power device is simultaneously connected to all the material box push rods; and all the material box push rods move synchronously in a direction close to or away from the material box bracket.

2. The static vacuum welding furnace according to claim 1, wherein the pushing-out buffer device comprises a material sheet pushing-out spring; the material sheet pushing-out plate slides relative to the material sheet pushing-out power device, with a sliding direction parallel to a movement direction of the material sheet pushing-out plate; and the material sheet pushing-out spring is arranged between the material sheet pushing-out power device and the material sheet pushing-out plate.

3. The static vacuum welding furnace according to claim 1, wherein the feeding and discharging device further comprises an adjustment device; the adjustment device is mounted on the material box jacking power device; the adjustment device is connected to the jacking frame; and an adjustment direction of the adjustment device is the same as a pushing-out direction of the material box pushing-out device.

4. The static vacuum welding furnace according to claim 1, wherein the static vacuum welding furnace comprises a plurality of groups of welding chambers arranged side by side and spaced apart from each other; each group of welding chambers comprises two welding chambers spaced apart from each other in a longitudinal direction; and each group of welding chambers is connected to the cover closing device.

5. The static vacuum welding furnace according to claim 4, wherein each cover closing device comprises a first cover closing device and a second cover closing device; the first cover closing device and the second cover closing device are connected to two welding chambers of the same group; and the second cover closing device is mounted on the first cover closing device.

\* \* \* \* \*